US012695792B2

(12) United States Patent
Verma et al.

(10) Patent No.: US 12,695,792 B2
(45) Date of Patent: *Jul. 28, 2026

(54) SERVICE ACCESS SERVICE EDGE SOLUTION FOR PROVIDING ENHANCED SECURITY FOR MOBILE NETWORKS

(71) Applicant: Palo Alto Networks, Inc., Santa Clara, CA (US)

(72) Inventors: Sachin Verma, Danville, CA (US); Leonid Burakovsky, Pleasanton, CA (US); Yogesh Vijay Ranade, San Jose, CA (US); Subramanya Yashwanth Bommakanti, Newark, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/756,632

(22) Filed: Jun. 27, 2024

(65) Prior Publication Data

US 2025/0323949 A1 Oct. 16, 2025

Related U.S. Application Data

(60) Provisional application No. 63/661,476, filed on Jun. 18, 2024, provisional application No. 63/634,210, (Continued)

(51) Int. Cl.
*H04L 9/40* (2022.01)
*H04L 67/10* (2022.01)
(Continued)

(52) U.S. Cl.
CPC .......... *H04L 63/20* (2013.01); *H04L 63/0227* (2013.01); *H04L 63/0263* (2013.01);
(Continued)

(58) Field of Classification Search
CPC . H04L 63/20; H04L 63/0227; H04L 63/0263; H04L 63/10; H04L 63/145;
(Continued)

(56) References Cited

U.S. PATENT DOCUMENTS 10,432,673 B2 * 10/2019 Bansal .................. H04L 69/162
10,574,670 B1 2/2020 Verma
(Continued)

FOREIGN PATENT DOCUMENTS

| AU | 2020204346 | 9/2021 |
| EP | 3902226 | 12/2022 |
| WO | 2023220304 | 11/2023 |

OTHER PUBLICATIONS

Arin, Route Origin Authorizations (ROAs), Overview, Feb. 24, 2025, 4 pages.
(Continued)

*Primary Examiner* — El Hadji M Sall
(74) *Attorney, Agent, or Firm* — Van Pelt, Yi & James LLP

(57) ABSTRACT

Techniques for providing security for providing a Secure Access Service Edge (SASE) solution for enhanced security for mobile networks (e.g., service provider networks for mobile subscribers) are disclosed. In some embodiments, various techniques to apply per network slice security in mobile networks with SASE are disclosed. In some embodiments, various techniques to apply per subscriber identity and/or equipment identity and/or subscriber number security in mobile networks with SASE are disclosed. In some embodiments, various techniques to apply per access point name/data network name (APN/DNN) security in mobile networks with SASE are disclosed. In some embodiments, various techniques to apply per location security in mobile networks with SASE are disclosed. In some embodiments, (Continued)

various techniques to apply per Radio Access Technology (RAT) security in mobile networks with SASE are disclosed.

23 Claims, 16 Drawing Sheets

Related U.S. Application Data filed on Apr. 15, 2024, provisional application No. 63/634,219, filed on Apr. 15, 2024.

(51) Int. Cl.

| | |
|---|---|
| *H04W 12/069* | (2021.01) |
| *H04W 12/088* | (2021.01) |
| *H04W 12/102* | (2021.01) |
| *H04W 12/122* | (2021.01) |
| *H04W 12/37* | (2021.01) |

(52) U.S. Cl.
CPC ............ *H04L 63/10* (2013.01); *H04L 63/145* (2013.01); *H04L 67/10* (2013.01); *H04W 12/069* (2021.01); *H04W 12/088* (2021.01); *H04W 12/102* (2021.01); *H04W 12/122* (2021.01); *H04W 12/37* (2021.01)

(58) Field of Classification Search
CPC .. H04L 67/10; H04L 63/0236; H04W 12/069; H04W 12/088; H04W 12/102; H04W 12/122; H04W 12/37; H04W 12/72
See application file for complete search history.

(56) References Cited

U.S. PATENT DOCUMENTS

| | | | |
|---|---|---|---|
| 10,659,335 | B1 | 5/2020 | Morris |
| 10,681,072 | B2 | 6/2020 | Alfano |
| 10,693,918 | B2 | 6/2020 | Verma |
| 10,715,491 | B2 | 7/2020 | Verma |
| 11,606,691 | B1 | 3/2023 | Verma |
| 11,622,313 | B1 | 4/2023 | Yadav |
| 11,950,114 | B2 | 4/2024 | Peitzer |
| 12,219,360 | B1 | 2/2025 | Gunjan |
| 12,301,569 | B2 | 5/2025 | Jeuk |
| 12,328,625 | B2 | 6/2025 | Verma |
| 2010/0103837 | A1 | 4/2010 | Jungck |
| 2014/0141743 | A1 | 5/2014 | Shaw |
| 2017/0078922 | A1* | 3/2017 | Raleigh .................. H04L 69/18 |
| 2018/0367574 | A1 | 12/2018 | Verma |
| 2020/0128399 | A1 | 4/2020 | Verma |
| 2020/0213187 | A1 | 7/2020 | Padmanabhan |
| 2020/0242251 | A1 | 7/2020 | Wisgo |
| 2020/0412824 | A1 | 12/2020 | Liguori |
| 2021/0234901 | A1 | 7/2021 | Thomas |
| 2021/0258248 | A1 | 8/2021 | Koenning |
| 2021/0266262 | A1 | 8/2021 | Subramanian |
| 2021/0336934 | A1 | 10/2021 | Deshmukh |
| 2022/0103594 | A1 | 3/2022 | Galloway |
| 2022/0103597 | A1 | 3/2022 | Gobena |
| 2022/0247788 | A1 | 8/2022 | Subbanna |
| 2022/0261276 | A1 | 8/2022 | Starr |
| 2022/0329573 | A1 | 10/2022 | Sood |
| 2022/0385579 | A1 | 12/2022 | Rangel Augusto |
| 2023/0100395 | A1* | 3/2023 | Yadav .................. H04W 12/72 370/392 |
| 2023/0269228 | A1 | 8/2023 | Mestery |
| 2024/0073698 | A1 | 2/2024 | Verma |
| 2024/0107294 | A1 | 3/2024 | Silverlock |
| 2024/0146727 | A1* | 5/2024 | Jeuk .................... H04L 63/0876 |
| 2024/0388914 | A1* | 11/2024 | Barton ............. H04W 28/0215 |
| 2025/0039138 | A1 | 1/2025 | Jain |
| 2025/0071552 | A1 | 2/2025 | Xie |
| 2025/0203367 | A1* | 6/2025 | Haddad ............... H04W 12/043 |
| 2025/0220049 | A1 | 7/2025 | Israel |
| 2025/0267460 | A1 | 8/2025 | Burgarella |
| 2025/0279980 | A1 | 9/2025 | Yadav |
| 2025/0310864 | A1 | 10/2025 | Yadav |

OTHER PUBLICATIONS

Author Unknown, Cluster configuration (proto), config.cluster.v3. Cluster, 37 pages, downloaded Oct. 16, 2024.

Google Cloud, Cloud Router Overview, Feb. 24, 2025, 4 pages.

ETSI, ETSI TS 129 244 V17.9.0 (Jul. 2023), LTE; 5G; Interface between the Control Plane and the User Plane nodes, (3GPP TS 29.244 version 17.9.0 Release 17), pp. 1-392.

ETSI, ETSI TS 129 561 V17.9.0 (Jul. 2023), 5G; 5G System; Interworking between 5G Network and external Data Networks; Stage 3, (3GPP TS 29.561 version 17.9.0 Release 17), pp. 1-92.

Google Cloud, Partner Interconnect overview, downloaded on Apr. 4, 2024, pp. 1-12.

Ahmad et al., Security in Software Defined Networks: A Survey, IEEE Communications Surveys & Tutorials, vol. 17 No. 4, 2015, pp. 2317-2346.

* cited by examiner

API Login Example for S-NSSAI

```
<uid-message>
    <version>1.0</version>
    <type>update</type>
    <payload>
        <ueip>
            <imsi>1234567891112233</imsi>
            <ipv4>2.2.3.3</ipv4>
            <ipv6>1002:db8:abcd:1100::/64</ipv6>
            <snssai-sst>1</snssai-sst>
            <snssai-sd>200</s-nssai-sd>
                <apn>internet</apn>
                <action>login</action>
        </ueip>
        <ueip>
            <imsi>1234567890012355</imsi>
            <ipv4>2.2.3.4</ipv4>
            <ipv6>1002:db8:abcd:1122::/64</ipv6>
            <snssai-sst>2</snssai-sst>
            <snssai-sd>400</snssai-id-sd>
                <apn>internet</apn>
                <action>login</action>
        </ueip>
    </payload>
</uid-message>
```

FIG. 8A

API Login Example for IMSI/IMEI/IPv4/IPv6/APN

```
<uid-message>
  <version>1.0</version>
  <type>update</type>
  <payload>
    <ueip>
      <imei>1234567890099333</imei>
      <imsi>1234567891122333</imsi>
      <ipv4>2.2.3.3</ipv4>
      <ipv6>1002:db8:abcd:1100::/64</ipv6>
      <apn>internet</apn>
      <action>login</action>
    </ueip>
    <ueip>
      <imsi>1234567890012355</imsi>
      <ipv4>2.2.3.4</ipv4>
      <ipv6>1002:db8:abcd:1122::/64</ipv6>
      <apn>internet</apn>
      <action>login</action>
    </ueip>
  </payload>
</uid-message>
```

FIG. 8B

API Login Example for Location

```
<uid-message>
    <version>1.0</version>
    <type>update</type>
    <payload>
        <ueip>
            <imsi>123456789112233</imsi>
            <imei>123456789009933</imei>
            <ipv4>2.2.3.3</ipv4>
            <ipv6>1002:db8:abcd:1100::/64</ipv6>
            <apn>internet</apn>
            <user-location-info>
                <cgi>
                    <mcc>001</mcc>
                    <mnc>002</mnc>
                    <lac>0101</lac>
                </cgi>
            </user-location-info>
            <action>login</action>
        </ueip>
    </payload>
</uid-message>
```

FIG. 8C

API Example for RAT

```
<uid-message>
  <version>1.0</version>
  <type>update</type>
  <payload>
    <ueip>
      <imsi>123456789112233</imsi>
      <imei>123456789009933</imei>
      <ipv4>2.2.3.3</ipv4>
      <ipv6>1002:db8:abcd:1100::/64</ipv6>
      <apn>internet</apn>
      <rat>EUTRAN</rat>
      <action>login</action>
    </ueip>
    <ueip>
      <imsi>123456789012355</imsi>
      <ipv4>2.2.3.4</ipv4>
      <ipv6>1002:db8:abcd:1122::/64<ipv6>
      <apn>internet</apn>
      <action>login</action>
    </ueip>
  </payload>
</uid-message>
```

FIG. 8D

API Logout Example

```
<uid-message>
    <version>1.0</version>
    <type>update</type>
    <payload>
        <ueip>
            <imsi>12345678911122333</imsi>
            <action>logout</action>
        </ueip>
    </payload>
</uid-message>
```

FIG. 9

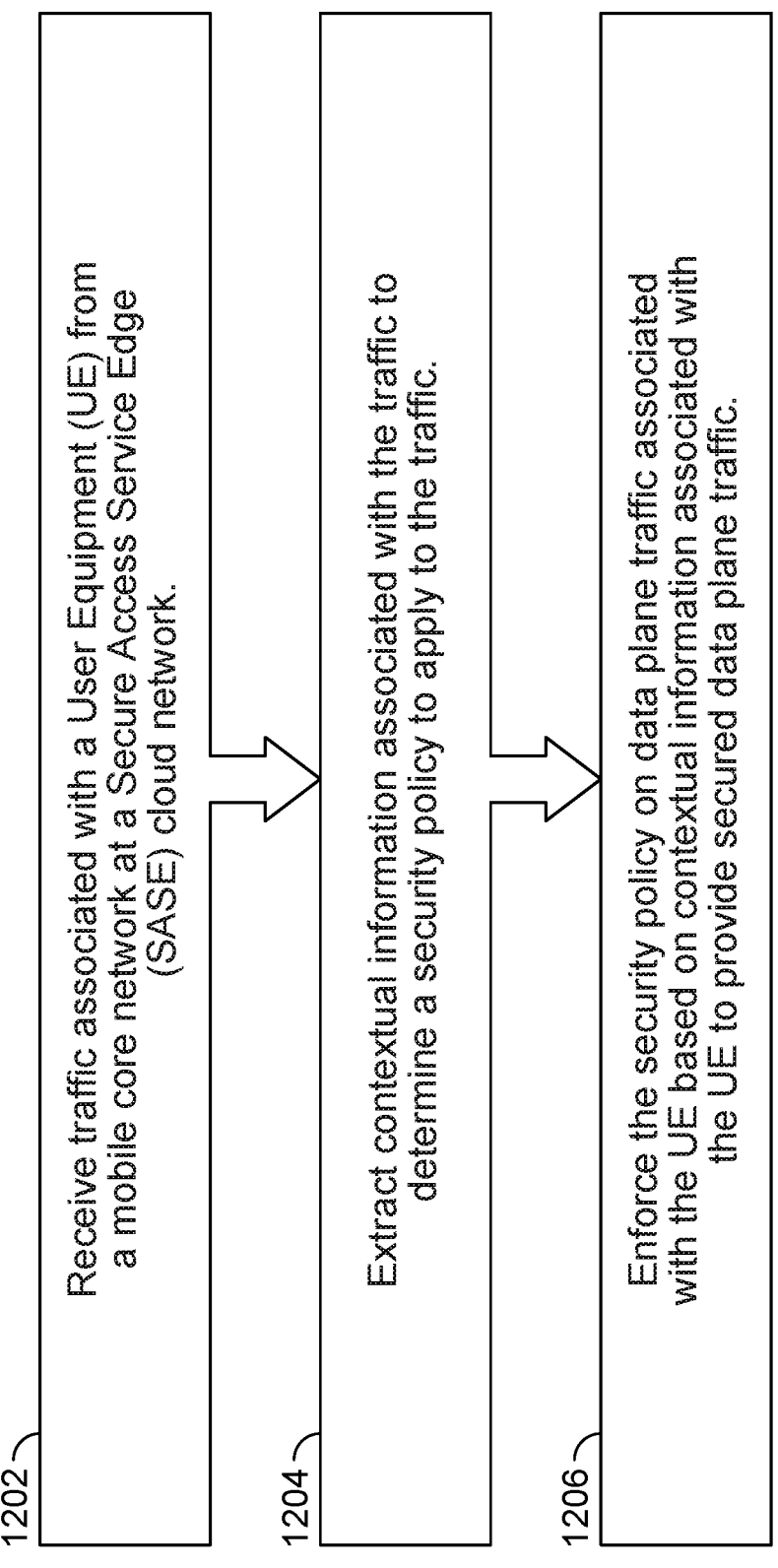

1202   Receive traffic associated with a User Equipment (UE) from a mobile core network at a Secure Access Service Edge (SASE) cloud network.

1204   Extract contextual information associated with the traffic to determine a security policy to apply to the traffic.

1206   Enforce the security policy on data plane traffic associated with the UE based on contextual information associated with the UE to provide secured data plane traffic.

FIG. 12

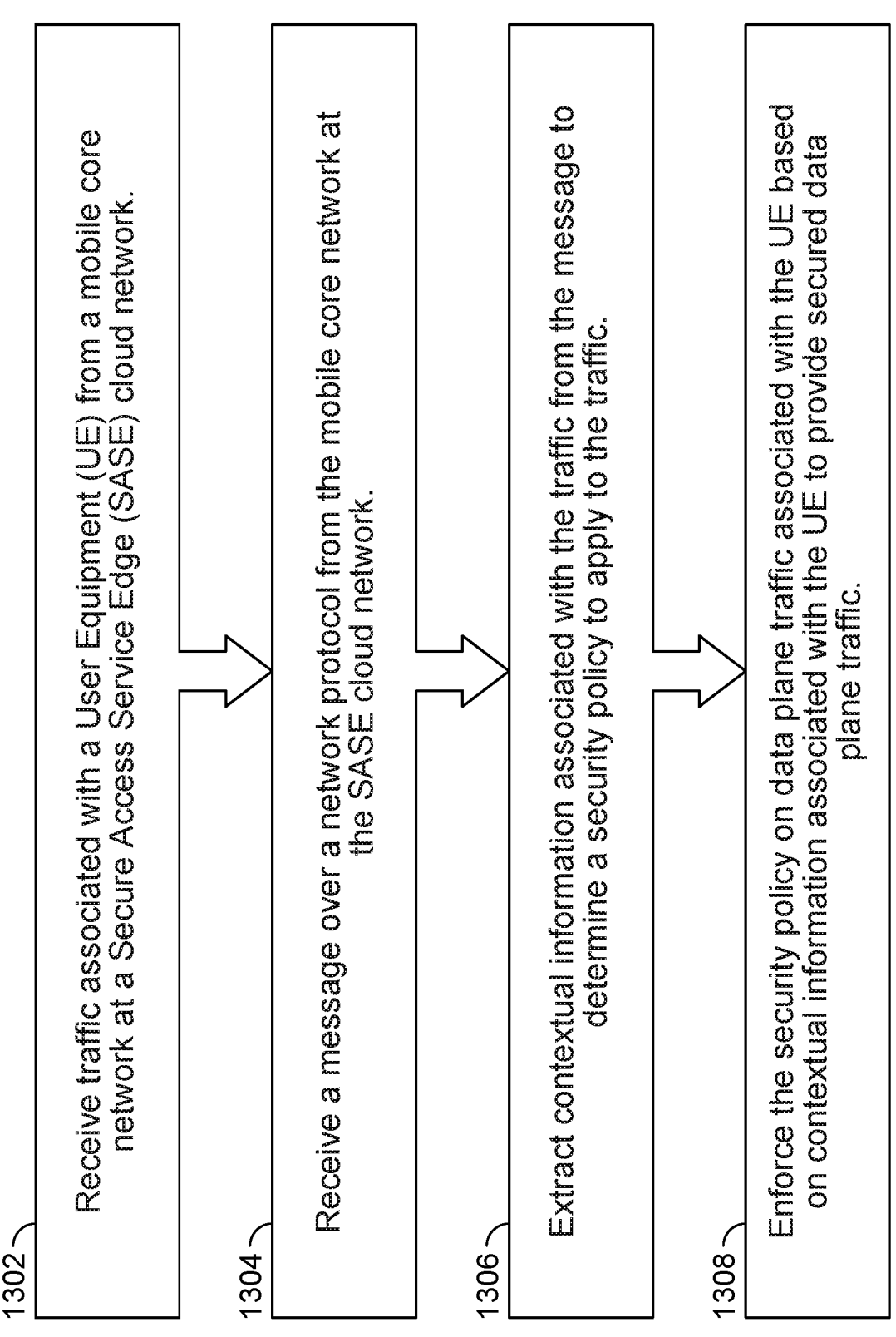

1302 — Receive traffic associated with a User Equipment (UE) from a mobile core network at a Secure Access Service Edge (SASE) cloud network.

1304 — Receive a message over a network protocol from the mobile core network at the SASE cloud network.

1306 — Extract contextual information associated with the traffic from the message to determine a security policy to apply to the traffic.

1308 — Enforce the security policy on data plane traffic associated with the UE based on contextual information associated with the UE to provide secured data plane traffic.

FIG. 13

SERVICE ACCESS SERVICE EDGE SOLUTION FOR PROVIDING ENHANCED SECURITY FOR MOBILE NETWORKS

CROSS REFERENCE TO OTHER APPLICATIONS

This application claims priority to U.S. Provisional Patent Application No. 63/634,210 entitled SECURE ACCESS SERVICE EDGE FOR MOBILE NETWORKS filed Apr. 15, 2024, U.S. Provisional Patent Application No. 63/634,219 entitled SECURE ACCESS SERVICE EDGE FOR MOBILE NETWORKS filed Apr. 15, 2024, and U.S. Provisional Patent Application No. 63/661,476 entitled SECURE ACCESS SERVICE EDGE SOLUTION FOR PROVIDING ENHANCED SECURITY FOR MOBILE NETWORKS filed Jun. 18, 2024, all of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRA WINGS

Various embodiments of the invention are disclosed in the following detailed description and the accompanying drawings.

FIG. 8A is an API login example for network slice related contextual information in accordance with some embodiments.

FIG. 8B is an API login example for subscriber identity and/or equipment identity and/or subscriber number related contextual information in accordance with some embodiments.

FIG. 8C is an API login example for location related contextual information in accordance with some embodiments.

FIG. 8D is an API login example for RAT related contextual information in accordance with some embodiments.

FIG. 9 is an API logout example in accordance with some embodiments.

FIG. 12 is a flow diagram of a process for providing a SASE solution for providing enhanced security for mobile networks in accordance with some embodiments.

FIG. 13 is another flow diagram of a process for providing a SASE solution for providing enhanced security for mobile networks in accordance with some embodiments.

DETAILED DESCRIPTION

Figure 1:
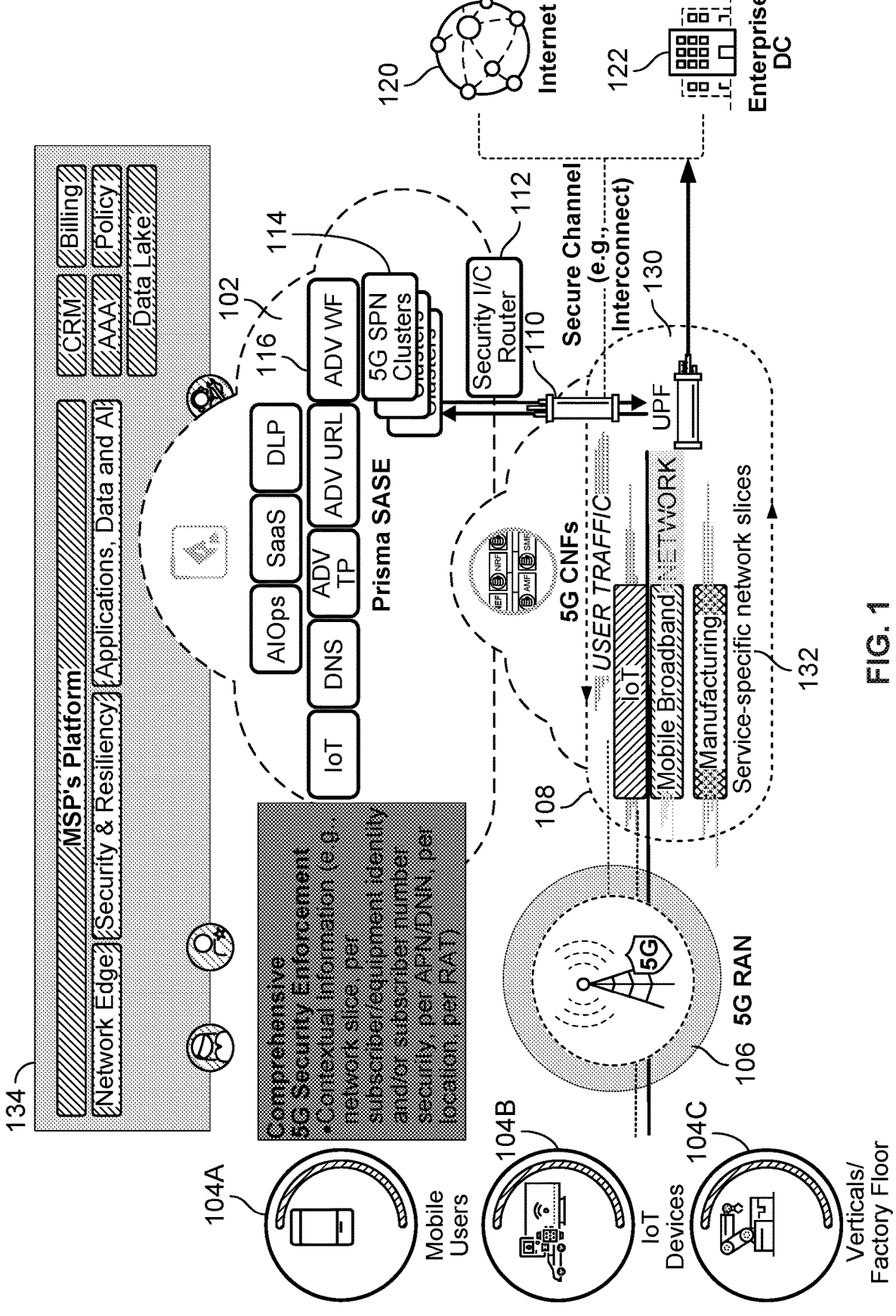
FIG. 1 is a block diagram of a Service Access Service Edge (SASE) solution for providing enhanced security for mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QOS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls, which can also be implemented using SD-WAN devices).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Security service providers also offer various commercially available cloud-based security solutions including various firewall, VPN, including Secure Access Service Edge (SASE), and various other security related services. For example, some security service providers have their own data centers in multiple geographies across the world to provide their customers such cloud-based security solutions.

Generally, a secure access service edge (SASE) brings together networking and network security services in a single cloud-based platform. This way, organizations can embrace cloud and mobility while reducing the complexity of dealing with multiple point products as well as saving IT, financial, and human resources.

For example, a SASE solution can generally include networking capabilities that an enterprise already uses. SASE can integrate the following networking features into a cloud-based infrastructure: SD-WAN edge devices, VPN services, and web proxying, which are each further described below.

Software-defined wide area network (SD-WAN) edge devices can provide easier connectivity for branch offices. With SASE, these devices are connected to a cloud-based infrastructure rather than to physical SD-WAN hubs located in other locations. By moving to the cloud, enterprises can eliminate the complexity of managing physical SD-WAN hubs and promote interconnectivity between branch offices.

Virtual private network (VPN) services incorporated by a SASE solution enable enterprises to route traffic through a VPN (e.g., using IPSec tunnels) to the SASE solution, and then to any application in the public or private cloud, delivered via Software as a Service (SaaS), or on the Internet. Traditional VPN was used for remote access to the internal data center, but it is typically not optimized for the current/evolving cloud computing environment.

Web proxying provides an alternate means of securely connecting users to applications by inspecting web-based protocols and traffic. Proxies were typically used for web security enforcement, but due to their inherent security limitations, they are now typically used as an architectural alternative for device traffic that cannot be fully inspected (e.g., personal devices that cannot accept an endpoint agent to force all web and non-web traffic through security inspection). When implemented as part of a SASE solution, proxies can offer organizations with legacy architectures an easier way of adopting the more robust security capabilities SASE has to offer.

In addition, SASE can incorporate the network security service tools enterprises have generally relied upon in prior computing environments. In a comprehensive SASE solution, the following security services can be delivered through a cloud-based infrastructure: zero trust network access (ZTNA), firewall/security as a service (FWaaS), secure web gateways (SWG), data loss prevention (DLP), and cloud access security broker (CASB), which are each further described below.

Zero Trust Network Access (ZTNA) applies the Zero Trust secure computing approach (e.g., never trust, always verify) to the cloud computing environment. For example, ZTNA can be applied to require that every user authenticate to access the cloud, restricting access and minimizing the risk of, for example, data loss. However, ZTNA solutions based on a software-defined perimeter (SDP) model can lack content inspection capabilities needed for consistent security protection for enterprises. Also, moving to a cloud-based SASE infrastructure can eliminate the complexity of connecting to a gateway. For example, users, devices, and apps can be identified no matter where they connect from, and the below further described ZTNA solutions of protecting applications can be applied across all services, including data loss prevention (DLP) and threat prevention.

Firewall as a service (FWaaS) provides next-generation firewall features in the cloud computing environment (e.g., also referred to herein as the cloud), thereby removing the need for physical hardware at branch and retail locations. For example, SASE solutions can integrate FWaaS into its cloud-based platform, allowing simplified management and deployment.

Overview of Techniques for Service Access Service Edge (SASE) for Mobile Networks Technical and security challenges with integration of mobile devices connecting via mobile networks (e.g., 4G/LTE, 5G, 6G, and later mobile devices) with Secure Access Service Edge (SASE) solutions exists.

Specifically, there exists a need for improved integration for mobile networks with SASE solutions as a Service.

Secure Access Service Edge (SASE) generally refers to providing converged network and security as a service capabilities, including Software Defined Wide Area Networking (SD-WAN), Secure Web Gateway (SWG), Cloud Access Security Broker (CASB), firewall as a service (e.g., using a Network Gateway Firewall (NGFW), which can be implemented using a VM-based or container-based firewall, such is in a cloud-based computing environment), and Zero Trust Network Access (ZTNA).

Specifically, what are needed are new and improved solutions for monitoring such network traffic and applying intelligent security for zero trust in mobile network environments using a SASE solution, such as for mobile devices (e.g., UEs) communicating over service provider networks (e.g., mobile networks associated with one or more service providers, such as AT&T, Verizon, etc.).

For example, there is a need for a Service Access Service Edge (SASE) solution for providing enhanced security for mobile networks to provide a comprehensive and Secure Service Edge (SSE) solution for 4G/5G/6G devices in SASE solutions (e.g., Prisma Access is an example SASE solution that is commercially available from Palo Alto Networks, Inc., headquartered in Santa Clara, CA).

Accordingly, the disclosed techniques for providing a SASE solution for providing enhanced security for mobile networks facilitate a system/process/computer program product for applying intelligent security for zero trust using a SASE solution as will now be further described below.

For example, the disclosed techniques for providing a SASE solution for providing enhanced security for mobile networks includes monitoring network traffic and applying intelligent security for zero trust for devices communicating via mobile network environments using a SASE solution, such as for mobile devices (e.g., UEs) connecting to and/or communicating over service provider networks (e.g., mobile networks associated with one or more service providers, such as AT&T, Verizon, etc.) for applying context-based and/or enhanced security in mobile networks based on subscriber-ID/International Mobile Subscriber Identity (IMSI)/Subscription Permanent Identifier (SUPI), equipment-ID/International Mobile Equipment Identity (IMEI)/Permanent Equipment Identifier (PEI), subscriber number (GPSI/MSISDN/external identifier), Network Slice ID/Single Network Slice Selection Assistance Information (S-NSSAI), User Equipment (UE) IP, Access Point Name (APN)/Data Network Name (DNN), and/or Radio Access Technology (RAT) Type information, IP to mobile subscriber traffic mappings, and/or other context-based information to facilitate enhanced security for such mobile devices communicating via mobile networks to access enterprise networks, applications including Software as a Service (SaaS)-based applications or other cloud based applications/services, and/or other Internet activities, such as will be further described below.

In some embodiments, a system/process/computer program product for Service Access Service Edge (SASE) for mobile networks includes receiving traffic associated with a User Equipment (UE) from a mobile core network at a SASE cloud network; enforcing a security policy on data plane traffic associated with the UE based on contextual information associated with the UE to provide secured data plane traffic; and forwarding the secured data plane traffic from the SASE cloud network to the mobile core network, wherein the secured data plane traffic egresses the mobile core network for its original destination.

In some embodiments, a system/process/computer program product for Service Access Service Edge (SASE) for mobile networks includes receiving traffic associated with a User Equipment (UE) from a mobile core network at a SASE cloud network; enforcing a security policy on data plane traffic associated with the UE based on contextual information associated with the UE to provide secured data plane traffic; and forwarding the secured data plane traffic from the SASE cloud network to its original destination.

Specifically, SASE (e.g., using a firewall as a service entity) is configured to process mobile network traffic received over the interconnect from the core mobile network (e.g., independent of any particular mobile core network protocols, as control plane signaling can be provided, for example, via RADIUS, Diameter, or SP API gateway services, such as further described herein) to extract contextual information, which can include User Equipment (UE) IP, IMSI/SUPI (e.g., Subscriber-ID), IMEI/PEI), subscriber number (GPSI/MSISDN/external identifier), S-NSSAI, APN/DNN, S-NSSAI, RAT Type information, IP to mobile subscriber traffic mappings, and/or other context-based information. The security platform is further configured to apply a security policy (e.g., enforce one or more security rules) based on the contextual information.

The disclosed techniques for providing SASE for mobile networks provides for a seamless integration with such service provider's mobile networks without requiring security equipment or software to be located in the service provider's core mobile networks, such as will be further described below.

Also, the disclosed techniques for providing SASE for mobile networks facilitate an agentless solution (e.g., an agent is not required to be deployed on the 5G mobile device). An agent for roaming devices and non-cellular/non-SIM devices can be provided using various techniques, such as will be further described below.

In addition, the disclosed techniques for providing SASE for mobile networks facilitate context-based security for mobile devices/users without requiring additional security equipment or security software/entities within the core mobile network (e.g., 5G packet core network).

In some embodiments, various techniques to apply per network slice security in mobile networks with SASE are disclosed.

In some embodiments, various techniques to apply per subscriber identity and/or equipment identity and/or subscriber number security in mobile networks with SASE are disclosed.

In some embodiments, various techniques to apply per access point name/data network name (APN/DNN) security in mobile networks with SASE are disclosed.

In some embodiments, various techniques to apply per location security in mobile networks with SASE are disclosed.

In some embodiments, various techniques to apply per Radio Access Technology (RAT) security in mobile networks with SASE are disclosed.

As such, the disclosed techniques for providing SASE for mobile networks facilitate a SASE-based solution for mobile network environments (e.g., macro 5G, private 5G, and/or hybrid environments) with consistent zero trust policies (e.g., based on User Equipment (UE) IP, IMSI/SUPI (e.g., Subscriber-ID), IMEI/PEI, subscriber number (GPSI/MSISDN/external identifier), S-NSSAI, APN/DNN, S-NSSAI, RAT Type information, user location, IP to mobile subscriber traffic mappings, and/or other context information).

Further, the disclosed techniques for providing SASE for mobile networks facilitate a comprehensive multi-tenancy solution that can manage all 5G enterprise networks (e.g., with a single pane of glass).

Moreover, the disclosed techniques for providing SASE for mobile networks facilitate a global solution across all geo-locations worldwide and provides auto-scalability based on traffic volumes and customer growth by providing a seamless mobile core network interconnect integration with a hyperscaler SASE solution.

As an example use case, a cellular (e.g., 4G/5G/6G/later cellular network standards) mobile network service provider can utilize the disclosed techniques for providing SASE for their 5G network customers to offer enhanced security services as a managed service, such as to their enterprise customers that have 5G enterprise deployments and/or to their individual subscribers, such as for additional subscription fees for such enhanced security services.

As another example use case, a cellular (e.g., 4G/5G/6G/later cellular network standards) mobile network service provider can utilize the disclosed techniques for providing SASE for their own internal enterprise users for enhanced security services to protect/safeguard their internal enterprise users on their mobile network activities.

For example, the disclosed techniques for providing SASE for mobile networks can facilitate applying intelligent security for zero trust for mobile networks (e.g., based on an extracted Subscriber-ID and/or other contextual information) using a SASE environment in communication with a core mobile network via the cloud-to-cloud interconnect, such as further described below.

As yet another example, the disclosed techniques for providing SASE for mobile networks can facilitate applying intelligent security for zero trust for mobile networks including providing 5G subscriber/user and/or 5G equipment/device level known and unknown threat identification and prevention for 5G mobile network environments.

As yet a further example, the disclosed techniques for providing SASE for mobile networks can facilitate applying intelligent security for zero trust for mobile networks including providing 5G subscriber/user and/or 5G equipment/device level application security for 5G mobile network environments.

As a final example, the disclosed techniques for providing SASE for mobile networks can facilitate applying intelligent security for zero trust for mobile networks providing 5G subscriber/user and/or 5G equipment/device level URL filtering for 5G mobile network environments.

Moreover, service providers and enterprises can utilize the disclosed techniques applying security for zero trust in mobile networks using a SASE solution to apply subscriber-ID based security over IP-based external network (e.g., similar to the Internet) perimeters.

Accordingly, new and improved security solutions that facilitate applying security (e.g., network-based security) for zero trust in a 5G Service Access Service Edge (SASE) environment (e.g., the security platform can be implemented using a firewall (FW)/Next Generation Firewall (NGFW), a network sensor acting on behalf of the firewall, or another (virtual) device/component that can implement security policies using the disclosed techniques, including, for example, Palo Alto Networks' Prisma Access Secure Service Edge (SSE), Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) (e.g., a 5G/later versions of mobile networks), and in some cases, on various interfaces (e.g., N6, etc.) and protocols (e.g., PFCP, RADIUS, Diameter, etc.) in mobile network environments are disclosed in accordance with some embodiments.

These and other embodiments and examples for providing a SASE solution for providing enhanced security for mobile networks will be further described below.

Example System Architectures for a Service Access Service Edge (SASE) Solution for Providing Enhanced Security for Mobile Networks Accordingly, in some embodiments, the disclosed techniques for SASE for mobile networks (e.g., such as for applying intelligent security for zero trust in mobile networks) can be provided using security platforms (e.g., the security function(s)/platform(s) can be implemented using Palo Alto Networks' Prisma Access Secure Service Edge (SSE), a firewall (FW)/Next Generation Firewall (NGFW), a network sensor acting on behalf of the firewall, or another (virtual) device/component that can implement a firewall as a service entity for enforcing one or more security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques, including using SD-WAN devices and/or clusters executing firewall as a service entities) and are configured to provide deep packet inspection (DPI) capabilities (e.g., including stateful inspection) of, for example, user/subscriber sessions (e.g., user/subscriber traffic) provided to the SASE solution via a secure channel, such as an interconnect (e.g., a cloud-to-cloud interconnect, such as from a Google Cloud Platform (GCP) cloud-based environment for the service provider's core mobile network in to a SASE cloud-based environment) to apply security on traffic in mobile networks based on a policy (e.g., layer-7 security and/or other security policy enforcement) as further described below.

Specifically, as will now be described with respect to various system embodiments, context-based security can be applied to mobile device related traffic (e.g., 4G/5G/6G/later related mobile network traffic) using a SASE solution, such as will be further described below with respect to various embodiments. In an example implementation, context-based security can be applied using SASE to such traffic passing thru mobile networks based on one or more of the following: a subscriber/user including IMSI, IMEI, Mobile Station International Subscriber Directory Number (MSISDN)/external identifier, RAT type, Network Slice, DNN/APN, location, user IP, and/or other contextual information.

FIG. 1 is a block diagram of a Service Access Service Edge (SASE) solution for providing enhanced security for mobile networks in accordance with some embodiments. The disclosed techniques for providing a SASE solution for mobile networks is shown in FIG. 1 with respect to a 5G mobile network environment. However, it would be apparent to one of ordinary skill in the art that the disclosed techniques can similarly be applied to various other example mobile service provider environments, such as 4G/5G/6G or later mobile network environments.

Specifically, FIG. 1 illustrates an example architecture for interconnecting a 5G mobile network cloud-based environment as shown at 108 (e.g., including 5G Cloud Native Network Functions (CNFs)) with a SASE cloud-based environment as shown at 102 (e.g., shown as a Prisma SASE hyperscaler cloud-based solution in this example, which is a commercially available SASE solution from Palo Alto Networks, Inc., headquartered in Santa Clara, CA, and/or other available SASE solution can similarly be used) using a cloud-to-cloud interconnect 110. In an example implementation, a Google Cloud Platform (GCP) Partner interconnect can be used to connect the 5G mobile network cloud (108) with the Prisma SASE cloud (102) (e.g., or for other available cloud-based computing environments, such as Amazon Web Services (AWS), Microsoft Azure, etc., and other cloud-based interconnects provided for those cloud-based computing environments can similarly be used). Specifically, the GCP Partner Interconnect connection (e.g., as shown at 110 in FIG. 1 or another secure channel can similarly be used) can be used for securely passing traffic between these cloud-based network environments 102 and 108.

Referring to SASE cloud 102, 5G Security Processing Nodes (SPN) clusters 114 provide firewall entities, specifically, firewalls as a service, for implementing the disclosed enhanced, context-based security for mobile devices connecting to the core 5G network shown at 108 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques via these firewall as a service entities) as further described below.

As referred to herein, IMSI is the concept referred to by ITU-T as the "International Mobile Subscription Identity." IMSI is a 14 or 15 digit number.

As also referred to herein, SUPI is a globally unique 5G "Subscription Permanent Identifier" allocated to each subscriber in the 5G system. As per 3GPP T.S 23.003 version 16.9.0, a SUPI type may indicate an IMSI, a network access identifier (NAI), a Global Line Identifier (GLI), or a Global Cable Identifier (GCI).

As also referred to herein, International Mobile Equipment Identifier (IMEI) is defined in 3GPP TS 23.003 available at https://portal.3gpp.org/desktopmodules/Specifications/SpecificationDetails.aspx?specificationId=729.

As shown in FIG. 1, the 5G mobile network environment can also include a 5G Radio Access Network (RAN) access as shown at 106, and/or other networks including, for example, Wi-Fi access and Fixed access (not shown), to facilitate data communications for subscribers (e.g., using User Equipment (UE), such as smart phones, laptops, computers (which may be in a fixed location), including for mobile users 104A, Internet of Things (IoT) devices 104B, and/or other cellular enabled computing devices/equipment including verticals/factor floor devices (e.g., Industrial IoT (IIoT), Commercial IoT (CIT)) as shown at 104C, and/or other network communication enabled devices, including over a Packet Data Network (PDN) (e.g., the Internet) 120 to access various applications, web services, content hosts, etc. and/or other networks) as well as to enterprise networks, such as for an enterprise data center (DC) as shown at 122.

As also shown in FIG. 1, a User Plane Function (UPF) 130 in the core mobile network 108 is in communication with Interconnect 110 for passing mobile device/user related traffic (e.g., including user plane traffic associated with any connected UEs) to the SASE environment 102 as similarly described above. UPF 130 is also in communication with enterprise DC 122 as well as the Internet 120 via the Interconnect shown at 110.

Specifically, the security is provided for the mobile device/user related traffic by passing the traffic from the core mobile network (108) via the Interconnect (110) to the firewall as a service entities, shown as 5G SPN clusters 114, via a security interconnect (I/C) router 112 as shown in FIG. 1. In an example implementation, the security I/C router can provide layer-3 Border Gateway Protocol (BFG) routing from the Interconnect 110 to the 5G SPN clusters 114 to facilitate connections (e.g., including cross-connects for dynamic load balancing, etc.) on a region by region basis (e.g., North American cloud environments can be connected, European cloud environments can be connected, and Asian cloud environments can be connected, and/or other regions or smaller divisions of regions, such as by country within Asia and by country within Europe, or Eastern United States, Central United States, Western United States, etc.). As such, the firewall as a service can perform the disclosed enhanced, context based security on such mobile device/user related traffic without having to locate the security/firewall entities within the 5G core mobile network, which is often preferred by the mobile network service providers (e.g., for latency and/or other technical reasons, mobile network service providers/mobile service providers (MSPs) may not want to deploy 3rd party vendor security services/equipment in the MSP's 5G mobile core network).

As will be further described below, this interconnect between the SASE cloud and the 5G core network cloud facilitates an effective and efficient mechanism for using the SASE solution to facilitate enhanced security for the mobile device/user traffic passing through the core mobile network (e.g., based on UE IP, IMEI, MSISDN/external identifier, IMSI, location network slice, RAT information, and/or other contextual information as will be further described below). For example, the core mobile network can provide service-specific network slices as shown at 132, which can be used as contextual information for applying distinct security enforcement based on those different network slices when the mobile device/network traffic is passed to the SASE for security policy enforcement using the firewall as a service entities, 5G SPN clusters 114.

In some embodiments, the firewall as a service entities provided via 5G SPN clusters 114 are configured to provide the following DPI capabilities: DPI of Packet Forwarding Control Protocol (PFCP) traffic (e.g., and/or other protocol formatted network traffic) received via the security I/C router 112 from the Interconnect 110. In an example implementation, the firewall as a service entities are configured to provide DPI capabilities (e.g., including to identify a UE IP, IMSI/SUPI, IMEI/PEI, S-NSSAI, APN/DNN, and/or RAT Type information, application (App) ID, etc.) of, for example, PFCP messages that pass through, for example, the N6 and/or other interfaces between UPF and other 5G core mobile network entities within the core mobile network environment 108 to apply context-based security traffic based on a policy (e.g., layer-7 security and/or other security policy enforcement) as further described below.

In some embodiments, an SP Interconnect (SPI) is provided if the SP has a separate internet breakout PoPs from their mobile packet core network such that network traffic (e.g., including control plane traffic) is provided from the SP mobile packet core network to the SASE cloud network environment for the SPI as similarly described above.

Specifically, in this example implementation, the firewall as a service entities provided via 5G SPN clusters 114 are configured to add an entry of the UE IP and contextual information, such as IMSI, IMEI, MSISDN/external identifier, and/or S-NSSAI related to this subscriber/user (e.g., user ID) in a data store (not shown) (e.g., a database, such as an SQL or other type of commercially available database). In this example implementation, the firewall as a service entities receive signaling message(s) from the 5G core mobile network (e.g., via an out-of-band) communication channel (e.g., using a Radius protocol, a Diameter protocol, and/or another protocol can similarly be used, such as via a proxy entity, such as the mobile core AAA entity) as part of a mobile user/device (UE) initial connection and authentication with the 5G core mobile network. This signal message communication can include, for example, a UE IP address (UE IP), mobile phone number, IMSI, IMEI, MSISDN/external identifier, location, APN/DNN, RAT, and/or other contextual information associated with the mobile device/user. Similarly, the core mobile network can also provide another message when the mobile device/user disconnects from the core mobile network, and then the SASE solution/firewall as a service entity/ies can remove the relevant entry of the UE IP and related context information from the database. In another example implementation, such out-of-band message communications can similarly be implemented using Application Programming Interfaces (APIs) (e.g., RESTful APIs) for secure communications between the 5G core network cloud and the SASE cloud.

In one embodiment, the disclosed 5G SASE techniques rely on the 5G packet core mobile network for interpreting the PFCP messages and sending the summarized information (e.g., including various associated contextual information as described herein) via a communication mechanism (e.g., RADIUS accounting messages, DIAMETER messages, another protocol can be similarly used, and/or an API communication mechanism can be similarly used) to the 5G SASE solution.

In another embodiment, the security platform is configured to utilize DPI to extract various contextual information from monitored 5G packet core mobile network protocols, which can include, for example, removing the entry of a UE IP and related contextual information from the data store if either of the following events occur based on the monitoring of the PFCP protocol: (1) a PFCP session deletion request/response message to delete the PFCP control session; and (2) user/subscriber session(s) timeout message (e.g., such timeouts can be configurable). More specifically, in this example implementation in which the security platform is configured to utilize DPI to extract various contextual information from monitored 5G packet core mobile network protocols, the firewall as a service entities provided via 5G SPN clusters 114 are configured to monitor PFCP messages including the following: (1) a PFCP Session Establishment Procedure (e.g., as per 3GPP T.S 29.244 v 18.3.0 (e.g., which is publicly available at https://portal.3gpp.org/desktopmodules/Specifications/SpecificationDetails.aspx?specificationId=3111), a PFCP Session Establishment procedure shall be used to set up a PFCP session between a CP function and a UP function and configure Rules in the UP function so that the UP function can handle incoming packets); (2) a PFCP Session Modification Procedure (e.g., the PFCP Session Modification procedure shall be used to modify an existing PFCP session, e.g., to configure a new rule, to modify an existing rule, to delete an existing rule); and (3) a PFCP Session Deletion Procedure (e.g., the PFCP Session Deletion procedure shall be used to delete an existing PFCP session between the CP function and the UP function) to facilitate extraction of the above-described contextual information.

In this example implementation, the firewall as a service entities provided via 5G SPN clusters 114 are configured to provide various enhanced, context-based security based on the monitored user plane data traffic flows received via the Interconnect at the mapped firewall as a service entity/ies (e.g., to set up the flow information for each new UE connection to the 5G core mobile network). The data traffic flows (e.g., sessions) can be correlated based on the source IP address for the data traffic flows the relevant UE IP received and stored above to associate such data traffic flows to the relevant context information associated with the UE IP. The firewall as a service entity/ies can then select and apply a security policy to each data traffic flow using the relevant contextual information for each such data traffic flow.

As such, the disclosed techniques for providing SASE for mobile networks facilitate a cloud native SASE stack with SIM-based authentication, federation, and interconnect with a core mobile network (e.g., a 4G/5G/6G/later mobile network core environment). For example, a secure channel (e.g., interconnect) can be similarly provided between the SASE network environment and a Packet Network Data Gateway (PGW) of a 4G core mobile network (e.g., and the herein described techniques can be similarly performed for a SASE solution for enhanced security for the 4G mobile network, including to receive GTP messages from the 4G mobile network to similarly extract context information for providing context-based security as similarly described herein with respect to various techniques for 5G mobile network environments).

In this example implementation, the firewall as a service entities provided via 5G SPN clusters 114 are configured to provide various SASE related services, including, as shown in FIG. 1, Artificial Intelligence powered Operations (AIOps), Software as a Service (SaaS) secure and high-speed connections (e.g., for Salesforce, Microsoft Office 365, and/or other SaaS solutions), Data Loss Prevention (DLP) security, IoT security, Domain Name System (DNS) security, Advanced Threat Protection (ATP) security, Advanced Uniform Resource Link (URL) security, and/or other SASE/security related services.

In addition, the firewall as a service entities provided via 5G SPN clusters 114 can also be in network communication with a Cloud Security Service 116 (e.g., a commercially available cloud-based security service, such as the Wild-Fire™ (ADV WF) cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the security platforms with dynamic prevention signatures for malware, DNS, URLs, CNC malware, and/or other malware as well as to receive malware samples for further security analysis.

Specifically, in this example implementation, the firewall as a service entities provided via 5G SPN clusters 114 are configured to apply the above-described context-based security policy enforcement to the mobile traffic (e.g., mobile device/user traffic, such as for each inspected/monitored session/flow) that is received via the Interconnect 110 and then pass the mobile traffic (e.g., secured/clean mobile traffic) back to the mobile core network 108 for routing (e.g., egress) from the mobile core network to a destination for the mobile traffic (e.g., for each session/flow), such as from UPF 130 to the Internet 120 (e.g., for SaaS applications and/or other applications/services, etc.) and/or to the Enterprise DC 122 (e.g., for on-premises applications/services, etc.).

As also shown in FIG. 1, the disclosed techniques using the SASE to mobile core cloud interconnect solution also facilitate a seamless integration of the SASE solution with the mobile network managed service provider's (MSP's) platform that includes billing systems, Authentication, Authorization, and Accounting (AAA), policy, data lake related systems and storage services and/or other MSP platform related infrastructure such as shown at 134.

As an example use case, a cellular (e.g., 4G/5G/6G/later cellular network standards) mobile network service provider can utilize the disclosed techniques for providing SASE for their 5G network customers to offer enhanced security services as a managed service, such as to their enterprise customers that have 5G enterprise deployments and/or to their individual subscribers, such as for additional subscription fees for such enhanced security services.

As another example use case, a cellular (e.g., 4G/5G/6G/later cellular network standards) mobile network service provider can utilize the disclosed techniques for providing SASE for their own internal enterprise users for enhanced security services to protect/safeguard their internal enterprise users on their mobile network activities.

Techniques to Apply Context-Based Security in Mobile Networks with SASE

There exist various technical challenges for applying context-based security in mobile networks with SASE. For example, on-premises (on-prem) based network security for enterprise customers or tenants connected through network slices in mobile networks is complex due to racking, stacking, and scaling-based provisioning requirements. Also, there is typically no tenant separation in on-prem based network security solutions.

As such, various techniques are disclosed for applying context-based security (e.g., based on a subscriber/user including IMSI, IMEI, Mobile Station International Subscriber Directory Number (MSISDN)/external identifier, RAT type, Network Slice, DNN/APN, location, user IP, and/or other contextual information) in mobile networks with SASE as will now be described with respect to various embodiments. Specifically, various embodiments are disclosed for applying context-based security in mobile networks with SASE using the Packet Forwarding Control Protocol (PFCP) protocol, Radius messages, Diameter messages, Syslog messages, APIs, and/or the Generic Network Virtualization Encapsulation (GENEVE) network encapsulation protocol (e.g., also referred to herein as Geneve protocol), which are each further described below.

Example use cases for applying context-based security in mobile networks with SASE using the disclosed techniques include the following two example use cases. As a first example use case, SASE for all networks (e.g., macro 5G, private 5G) with zero trust policies can be implemented based on contextual information (e.g., based on a subscriber/user including IMSI, IMEI, MSISDN/external identifier, RAT type, Network Slice, DNN/APN, location, user IP, and/or other contextual information). As a second example use case, a comprehensive multi-tenancy to control all managed 5G enterprise network environments with a single pane of glass can be implemented. These and other example use cases will be apparent in view of the below described techniques for applying context-based security in mobile networks with SASE.

Figure 2:
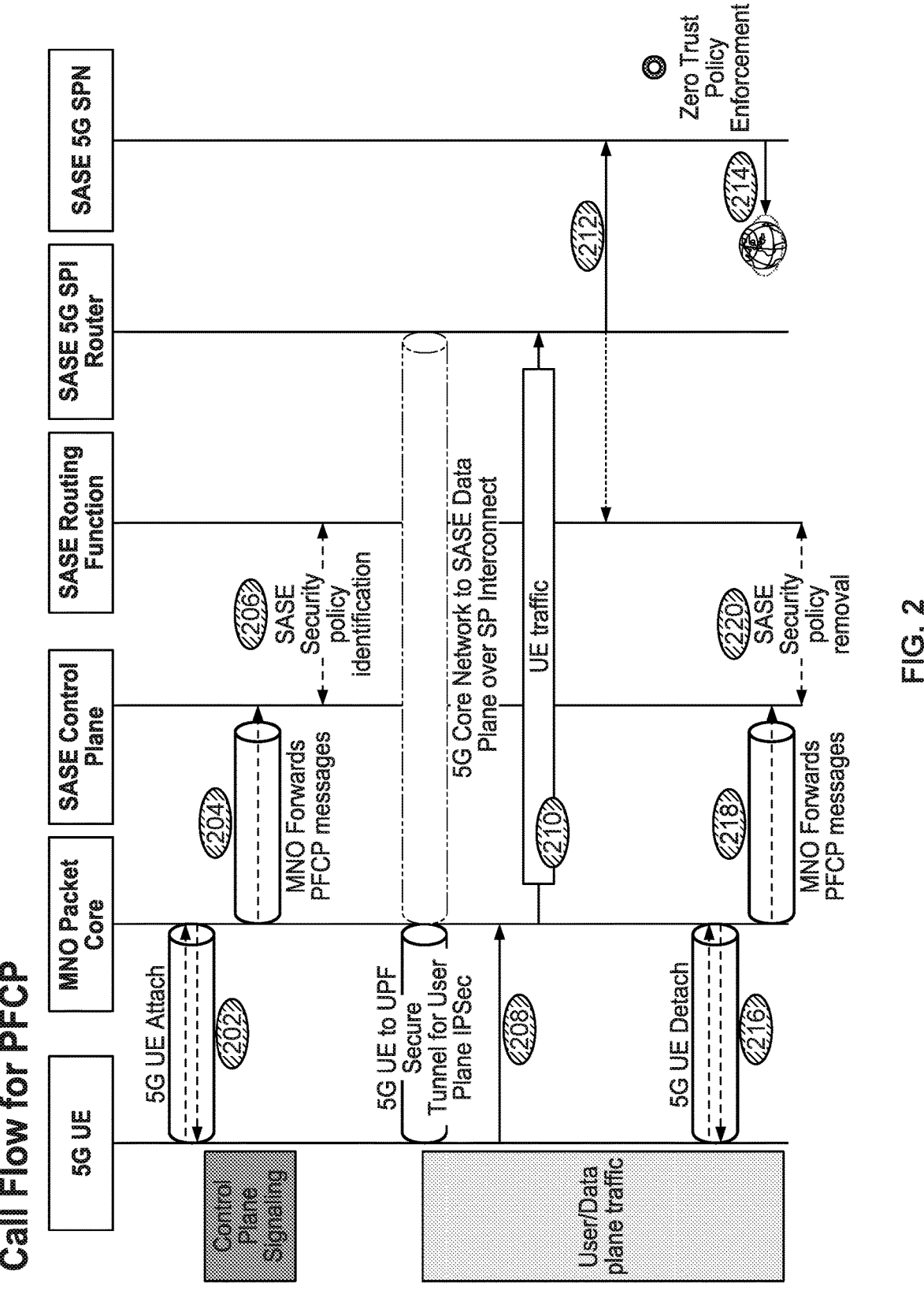
FIG. 2 is a call flow diagram of a SASE solution for providing enhanced security for mobile networks using the PFCP protocol in accordance with some embodiments.

Techniques to Apply Context-Based Security in Mobile Networks with SASE Using the PFCP Protocol FIG. 2 is a call flow diagram of a SASE solution for providing enhanced security for mobile networks using the PFCP protocol in accordance with some embodiments. The disclosed techniques for providing a SASE solution for mobile networks are shown in FIG. 2 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

Specifically, in this example call flow diagram of a SASE solution for applying security, such as per network slice security (e.g., or based on other contextual information, such as based on a subscriber/user including IMSI, IMEI, MSISDN/external identifier, RAT type, DNN/APN, location, user IP, and/or other contextual information), in mobile networks with SASE using the Packet Forwarding Control Protocol (PFCP) protocol, SASE cloud 102, such as shown in FIG. 1, receives PFCP messages from a mobile network over a secure channel, such as an interconnect with IPsec 110, such as shown in FIG. 1. The SASE cloud processes the PFCP messages including PFCP session establishment requests/responses, and PFCP session modification request/ response messages to extract network slice (S-NSSAI) and user equipment (UE) IP information (e.g., and/or other contextual information can similarly be extracted, such as a subscriber/user including IMSI, IMEI, MSISDN/external identifier, RAT type, DNN/APN, location, user IP, and/or other contextual information). The SASE cloud can add an entry of the UE IP and contextual information including the S-NSSAI related to this subscriber/user in a data store (e.g., as shown at 134 in FIG. 1).

The SASE cloud can remove the entry of a UE IP and related contextual information from the data store in the following events: (1) a PFCP session deletion request/ response to delete the PFCP control session is received; or (2) a User/Subscriber session times out (e.g., the timeout can be a configurable setting).

More specifically, to apply context-based security on the traffic from UEs, a Security Platform including a Security Processing Node (SPN) in the SASE cloud, such as shown at 114 in FIG. 1, can utilize a UE IP mapping data store (e.g., as shown at 134 in FIG. 1). The UE traffic is routed over a secure channel between the mobile network and the SASE cloud such as similarly described above with respect to FIG. 1.

A PFCP Session Establishment Procedure call flow is provided in FIG. 2. As per 3GPP Technical Specification 29.244 version 17.9.0, which is publicly available at https:// www.ctsi.org/deliver/etsi_ts/129200_129299/129244/ 17.09.00_60/ts_129244v170900p.p df, a PFCP Session Establishment procedure shall be used to set up a PFCP session between a CP function and UP function and configure Rules in the UP function so that the UP function can handle incoming packets. The PFCP Session Modification procedure shall be used to modify an existing PFCP session, e.g., to configure a new rule, to modify an existing rule, to delete an existing rule. The PFCP Session Deletion procedure shall be used to delete an existing PFCP session between the CP function and the UP function.

Referring to FIG. 2, at 202, a 5G UE attach message is sent from a 5G UE to an MNO Packet Core. At 204, the MNO forwards PFCP messages to a SASE Control Plane, such as over a secure channel (e.g., secure channel/inter-connect 110 as shown in FIG. 1). At 206, a SASE routing function performs a security policy identification (e.g., based on contextual information extracted from the PFCP messages, such as based on a network slice and/or other contextual information, such as subscriber/user including IMSI, IMEI, MSISDN/external identifier, RAT type, DNN/ APN, location, user IP, and/or other contextual information as further described herein). At 208, 5G UE to UPF Secure Tunnel for User Plane IPSec traffic is established between the 5G UE and MNO Packet Core for User/Data Plane traffic. At 210, the UE traffic (e.g., User/Data Plane traffic) is transmitted to a SASE 5G SPI Router (e.g., Security I/C Router 112 as shown in FIG. 1). At 212, the UE traffic (e.g., User/Data Plane traffic) is transmitted to a SASE 5G SPN (e.g., 5G SPN Clusters 114 as shown in FIG. 1), which can then, as shown at 214, egress to the Internet (e.g., as shown at 120 in FIG. 1). At 216, a 5G UE Detach message is sent from the 5G UE to the MNO Packet Core. At 218, the MNO forwards the PFCP messages to the SASE Control Plane. At 220, the SASE Control Plane and SASE Routing Function communicate the SASE Security policy removal for the terminating session for the 5G UE.

Figure 3:
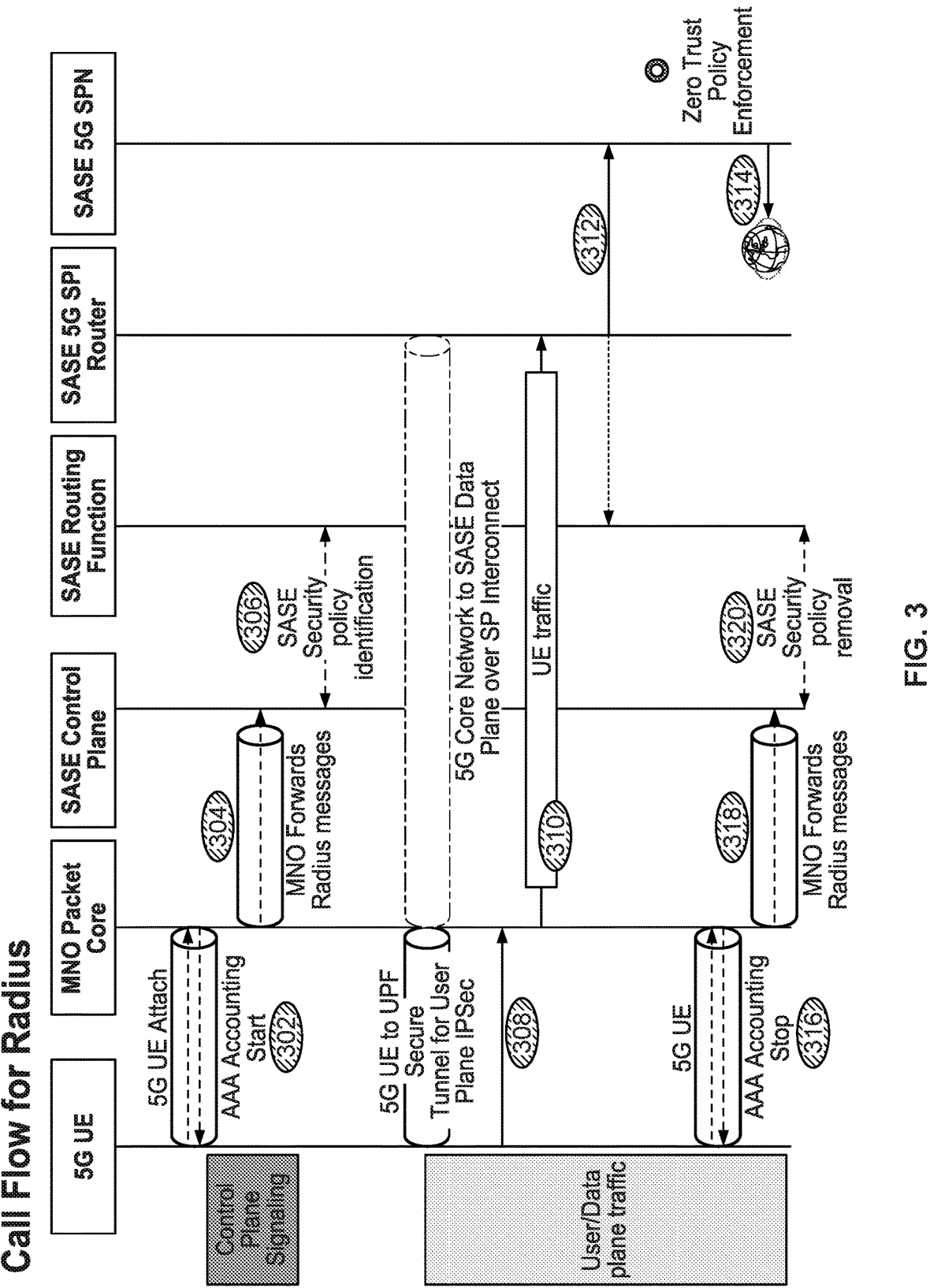
FIG. 3 is a call flow diagram of a SASE solution for providing enhanced security for mobile networks using the Radius protocol in accordance with some embodiments.

Techniques to Apply Per Context-Based Security in Mobile Networks with SASE Using the Radius Protocol FIG. 3 is a call flow diagram of a SASE solution for providing enhanced security for mobile networks using the Radius protocol in accordance with some embodiments. The disclosed techniques for providing a SASE solution for mobile networks are shown in FIG. 3 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

Specifically, in this example call flow diagram of a SASE solution for applying security, such as per network slice security (e.g., and/or other based on other contextual, such as subscriber/user including IMSI, IMEI, MSISDN/external identifier, RAT type, DNN/APN, location, user IP, and/or other contextual information), in mobile networks with SASE using the Radius protocol, SASE cloud 102, such as shown in FIG. 1, receives Radius messages from a mobile network over a secure channel, such as an interconnect with IPsec 110, such as shown in FIG. 1. The SASE cloud processes the Radius messages including Accounting-Request (START)/Accounting-Response (START), Accounting-Request (interim-update)/Accounting-Response (interim-update) messages to extract network slice (S-NSSAI) and user equipment (UE) IP information. The SASE cloud will add entry of UE IP and contextual information including S-NSSAI related to this subscriber/user in a data store (e.g., as shown at 134 in FIG. 1).

Examples of Attribute Value Pairs (AVPs) required in Radius messages include, for example, the following: (1) Framed-IP-Address-IPv4 address of UE; and (2) Framed-IPv6-Prefix-IPv6 Prefix assigned to UE.

Examples of Vendor Specific Attributes (VSA) include 3GPP-Session-S-NSSAI.

As such, in this example implementation, the SASE cloud can remove entry of a UE IP and related contextual information from the data store in the event of the following: (1) Accounting-Request (STOP)/Accounting-Response (STOP) is received; or (2) a User/Subscriber session times out (e.g., the timeout can be a configurable setting).

More specifically, to apply context-based security on the traffic from UEs, a Security Platform including a Security Processing Node (SPN) in the SASE cloud, such as shown at 114 in FIG. 1, can utilize a UE IP mapping data store (e.g., as shown at 134 in FIG. 1). The UE traffic is routed over a secure channel between the mobile network and the SASE cloud such as similarly described above with respect to FIG. 1.

Referring generally to Radius message flows in a 5G network, as per 3GPP Technical Specification 29.561 version 17.9.0, which is publicly available at https://www.ctsi.org/deliver/etsi_ts/129500_129599/129561/17.09.00_60/ts_129561v170900p.p df, RADIUS Accounting shall be used according to IETF RFC 2866, IETF RFC 3162 and IETF RFC 4818. The RADIUS accounting client function may reside in an SMF. The RADIUS accounting client may send information to a DN-AAA server, which is identified during the DNN provisioning. The DN-AAA server may store this information and use it to automatically identify the user. This information can be trusted because the 3GPP network has authenticated the subscriber (e.g., USIM card and possibly other authentication methods).

Referring to FIG. 3, at 302, a 5G UE attach message and an AAA Accounting Start message are sent from a 5G UE to an MNO Packet Core. At 304, the MNO forwards Radius messages to a SASE Control Plane, such as over a secure channel (e.g., secure channel/interconnect 110 as shown in FIG. 1). At 306, a SASE routing function performs a security policy identification (e.g., based on contextual information extracted from the Radius messages, such as based on a network slice and/or other contextual information, such as subscriber/user including IMSI, IMEI, MSISDN/external identifier, RAT type, DNN/APN, location, user IP, and/or other contextual information). At 308, 5G UE to UPF Secure Tunnel for User Plane IPSec traffic is established between the 5G UE and the MNO Packet Core for User/Data Plane traffic. At 310, the UE traffic (e.g., User/Data Plane traffic) is transmitted to a SASE 5G SPI Router (e.g., Security I/C Router 112 as shown in FIG. 1). At 312, the UE traffic (e.g., User/Data Plane traffic) is transmitted to a SASE 5G SPN (e.g., 5G SPN Clusters 114 as shown in FIG. 1), which can then, as shown at 314, egress to the Internet (e.g., as shown at 120 in FIG. 1). At 316, a 5G UE Detach message and AAA Accounting Stop message are sent from the 5G UE to the MNO Packet Core. At 318, the MNO forwards the Radius messages to the SASE Control Plane. At 320, the SASE Control Plane and the SASE Routing Function communicate the SASE Security policy removal for the terminating session for the 5G UE.

Figure 4:
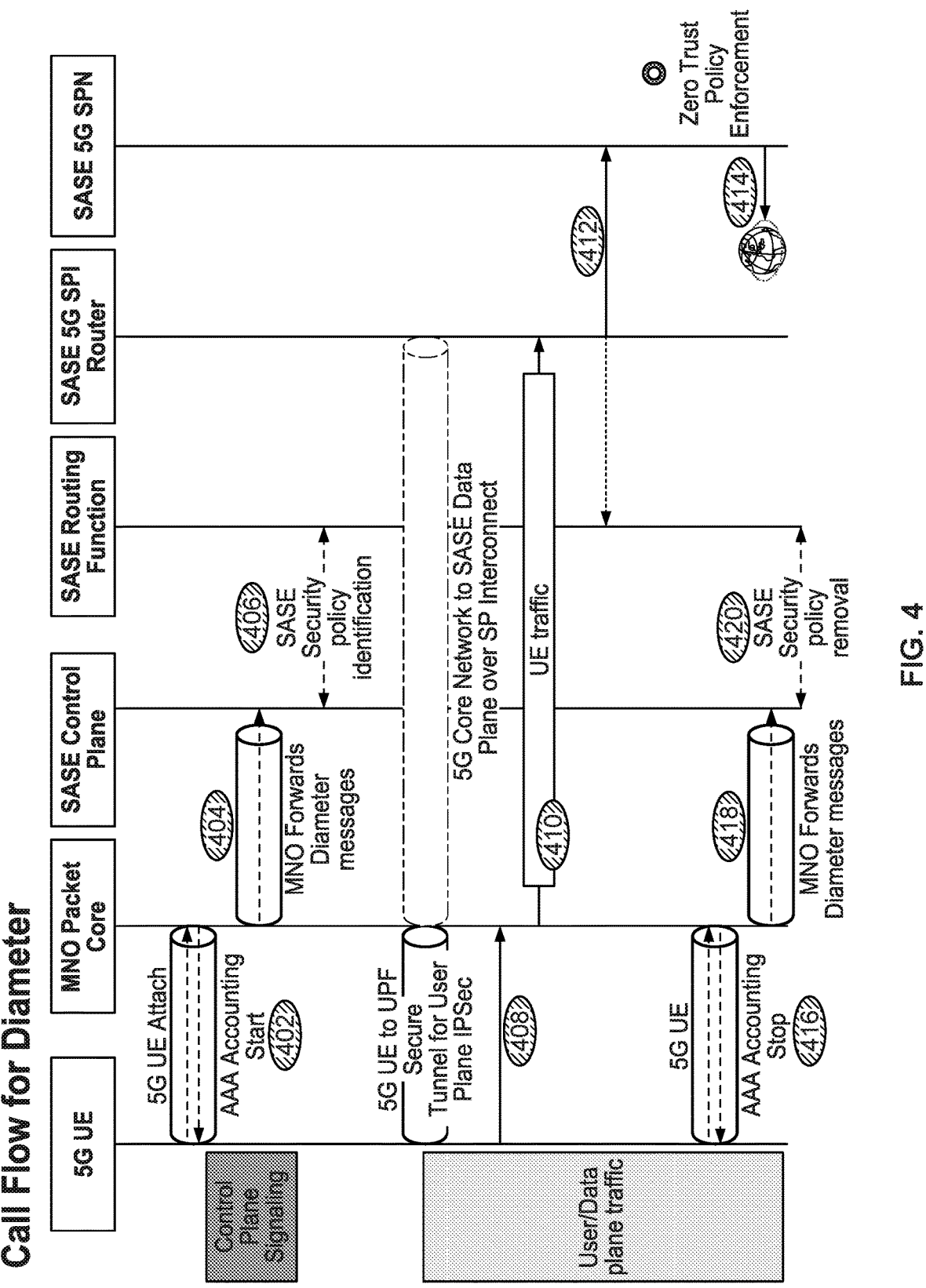
FIG. 4 is a call flow diagram of a SASE solution for providing enhanced security for mobile networks using the Diameter protocol in accordance with some embodiments.

Techniques to Apply Per Context-Based Security in Mobile Networks with SASE Using the Diameter Protocol FIG. 4 is a call flow diagram of a SASE solution for providing enhanced security for mobile networks using the Diameter protocol in accordance with some embodiments. The disclosed techniques for providing a SASE solution for mobile networks are shown in FIG. 4 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

Specifically, in this example call flow diagram of a SASE solution for applying security, such as per network slice security (e.g., and/or other contextual information can similarly be extracted, such as subscriber/user including IMSI, IMEI, MSISDN/external identifier, RAT type, DNN/APN, location, user IP, and/or other contextual information), in mobile networks with SASE using the Diameter protocol, SASE cloud 102, such as shown in FIG. 1, receives Radius messages from a mobile network over a secure channel, such as an interconnect with IPsec 110, such as shown in FIG. 1. The SASE cloud processes the Radius messages including Accounting-Request (START)/Accounting-Response (START), Accounting-Request (Interim)/Accounting-Response (Interim) messages to extract network slice (S-NS-SAI) and user equipment (UE) IP information. The SASE cloud will add entry of UE IP and contextual information including S-NSSAI related to this subscriber/user in a data store (e.g., as shown at 134 in FIG. 1).

Examples of Attribute Value Pairs (AVPs) required in Diameter messages include, for example, the following: (1) Framed-IP-Address-IPv4 address of UE; and (2) Framed-IPv6-Prefix-IPv6 Prefix assigned to UE.

Examples of Vendor Specific Attributes (VSA) include 3GPP-Session-S-NSSAI.

As such, in this example implementation, the SASE cloud can remove entry of a UE IP and related contextual information from the data store in the event of the following: (1) Accounting-Request (STOP)/Accounting-Response (STOP) is received; or (2) a User/Subscriber session times out (e.g., the timeout can be a configurable setting).

More specifically, to apply context-based security on the traffic from UEs, a Security Platform including a Security Processing Node (SPN) in the SASE cloud, such as shown at 114 in FIG. 1, can utilize a UE IP mapping data store (e.g., as shown at 134 in FIG. 1). The UE traffic is routed over a secure channel between the mobile network and the SASE cloud such as similarly described above with respect to FIG. 1.

Referring generally to Diameter message flows in a 5G network, as per 3GPP Technical Specification 29.561 version 17.9.0, which is publicly available at https://www.ctsi.org/deliver/etsi_ts/129500_129599/129561/17.09.00_60/ts_129561v170900p.p df, Diameter Accounting shall be used according to IETF RFC 7155. The SMF and the DN-AAA may advertise the support of the Diameter base accounting application by including the value of the application identifier in the Acct-Application-Id AVP and the value of the 3GPP (10415) in the Vendor Id AVP of the Capabilities-Exchange-Request and Capabilities-Exchange-Answer commands as specified in IETF RFC 6733, i.e., as part of the Vendor-Specific-Application-Id AVP. The Diameter accounting client function may reside in an SMF. The Diameter accounting client may send information to a DN-AAA server, which is identified during the DNN provisioning. The DN-AAA server may store this information and use it to automatically identify the user. This information can be trusted because the 3GPP network has authenticated the subscriber (e.g., USIM card and possibly other authentication methods).

Referring to FIG. 4, at 402, a 5G UE attach message and an AAA Accounting Start message are sent from a 5G UE to an MNO Packet Core. At 404, the MNO forwards Diameter messages to a SASE Control Plane, such as over a secure channel (e.g., secure channel/interconnect 110 as shown in FIG. 1). At 406, a SASE routing function performs a security policy identification (e.g., based on contextual information extracted from the Diameter messages, such as based on a network slice and/or other contextual information, such as subscriber/user including IMSI, IMEI, MSISDN/external identifier, RAT type, DNN/APN, location, user IP, and/or other contextual information). At 408, 5G UE to UPF Secure Tunnel for User Plane IPSec traffic is established between the 5G UE and MNO Packet Core for User/Data Plane traffic. At 410, the UE traffic (e.g., User/Data Plane traffic)

is transmitted to a SASE 5G SPI Router (e.g., Security I/C Router 112 as shown in FIG. 1). At 412, the UE traffic (e.g., User/Data Plane traffic) is transmitted to a SASE 5G SPN (e.g., 5G SPN Clusters 114 as shown in FIG. 1), which can then, as shown at 414, egress to the Internet (e.g., as shown at 120 in FIG. 1). At 416, a 5G UE Detach message and AAA Accounting Stop message are sent from the 5G UE to the MNO Packet Core. At 418, the MNO forwards the Diameter messages to the SASE Control Plane. At 420, the SASE Control Plane and SASE Routing Function communicate the SASE Security policy removal for the terminating session for the 5G UE.

Figure 5:
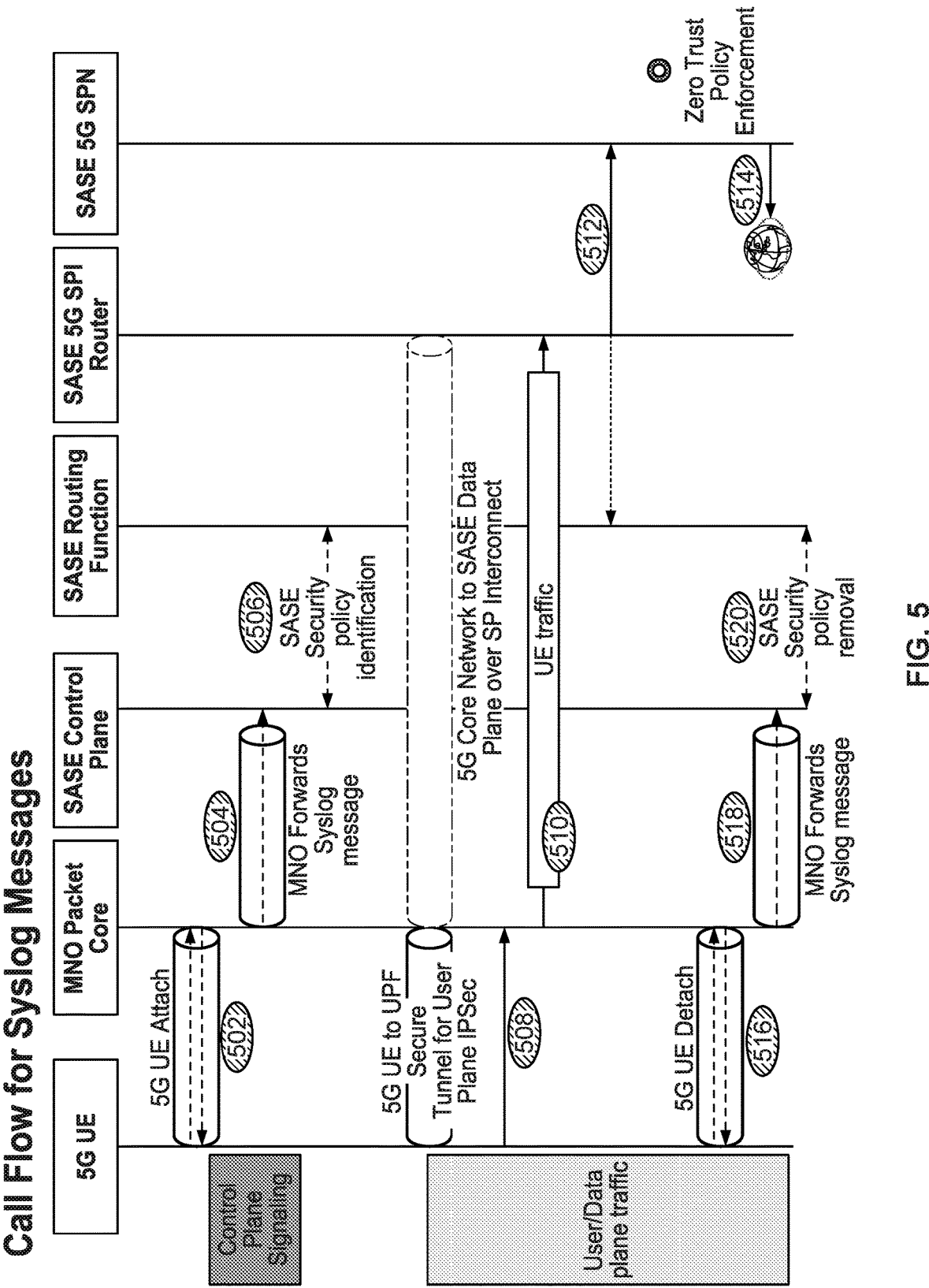
FIG. 5 is a call flow diagram of a SASE solution for providing enhanced security for mobile networks using Syslog messages in accordance with some embodiments.

Techniques to Apply Per Context-Based Security in Mobile Networks with SASE Using Syslog Messages FIG. 5 is a call flow diagram of a SASE solution for providing enhanced security for mobile networks using Syslog messages in accordance with some embodiments. The disclosed techniques for providing a SASE solution for mobile networks are shown in FIG. 5 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

Specifically, in this example call flow diagram of a SASE solution for applying security, such as per network slice security (e.g., and/or other contextual information, such as subscriber/user including IMSI, IMEI, MSISDN/external identifier, RAT type, DNN/APN, location, user IP, and/or other contextual information), in mobile networks with SASE using Syslog messages, SASE cloud 102, such as shown in FIG. 1, receives Syslog messages from a mobile network over a secure channel, such as an interconnect with IPsec 110, such as shown in FIG. 1. The SASE cloud processes the Syslog messages to extract network slice (S-NSSAI) and user equipment (UE) IP information (e.g., and/or other contextual information can similarly be extracted, such as subscriber/user including IMSI, IMEI, MSISDN/external identifier, RAT type, DNN/APN, location, user IP, and/or other contextual information). The SASE cloud will add entry of UE IP and contextual information including S-NSSAI related to this subscriber/user in a data store (e.g., as shown at 134 in FIG. 1).

As such, in this example implementation, mobile networks have network functions that can generate Syslog messages for certain events, including, for example, PDU Session Creation and PDU Session Deletion. Mobile Service Providers can configure these network functions to send Syslog messages that contain information about creation and deletion events. The SASE cloud will parse the Syslog messages for creation events to map IP addresses to Network Slice-IDs and similarly parse for deletion events to delete outdated mappings. Deleting outdated mappings is useful in mobile networks where IP address assignments can change when a user equipment (UE) is rebooted or during some other scenario. The SASE cloud can remove entry of a UE IP and related contextual information from the data store in the event of the following: (1) a Syslog message is received when a PDU session is deleted; or (2) a User/Subscriber session times out (e.g., the timeout can be a configurable setting).

More specifically, to apply context-based security on the traffic from UEs, a Security Platform including a Security Processing Node (SPN) in the SASE cloud, such as shown at 114 in FIG. 1, can utilize a UE IP mapping data store (e.g., as shown at 134 in FIG. 1). The UE traffic is routed over a secure channel between the mobile network and the SASE cloud such as similarly described above with respect to FIG. 1.

Referring to FIG. 5, at 502, a 5G UE attach message is sent from a 5G UE to an MNO Packet Core. At 504, the MNO forwards a Syslog message(s) to a SASE Control Plane, such as over a secure channel (e.g., secure channel/interconnect 110 as shown in FIG. 1). At 506, a SASE routing function performs a security policy identification (e.g., based on contextual information extracted from the Syslog message(s), such as based on a network slice and/or other contextual information, such as subscriber/user including IMSI, IMEI, MSISDN/external identifier, RAT type, DNN/APN, location, user IP, and/or other contextual information). At 508, 5G UE to UPF Secure Tunnel for User Plane IPSec traffic is established between the 5G UE and MNO Packet Core for User/Data Plane traffic. At 510, the UE traffic (e.g., User/Data Plane traffic) is transmitted to a SASE 5G SPI Router (e.g., Security I/C Router 112 as shown in FIG. 1). At 512, the UE traffic (e.g., User/Data Plane traffic) is transmitted to a SASE 5G SPN (e.g., 5G SPN Clusters 114 as shown in FIG. 1), which can then, as shown at 514, egress to the Internet (e.g., as shown at 120 in FIG. 1). At 516, a 5G UE Detach message is sent from the 5G UE to the MNO Packet Core. At 518, the MNO forwards the Syslog message(s) to the SASE Control Plane. At 520, the SASE Control Plane and SASE Routing Function communicate the SASE Security policy removal for the terminating session for the 5G UE.

Techniques to Apply Per Context-Based Security in Mobile Networks with SASE Using Application Programming Interfaces (APIs)

Figure 6:
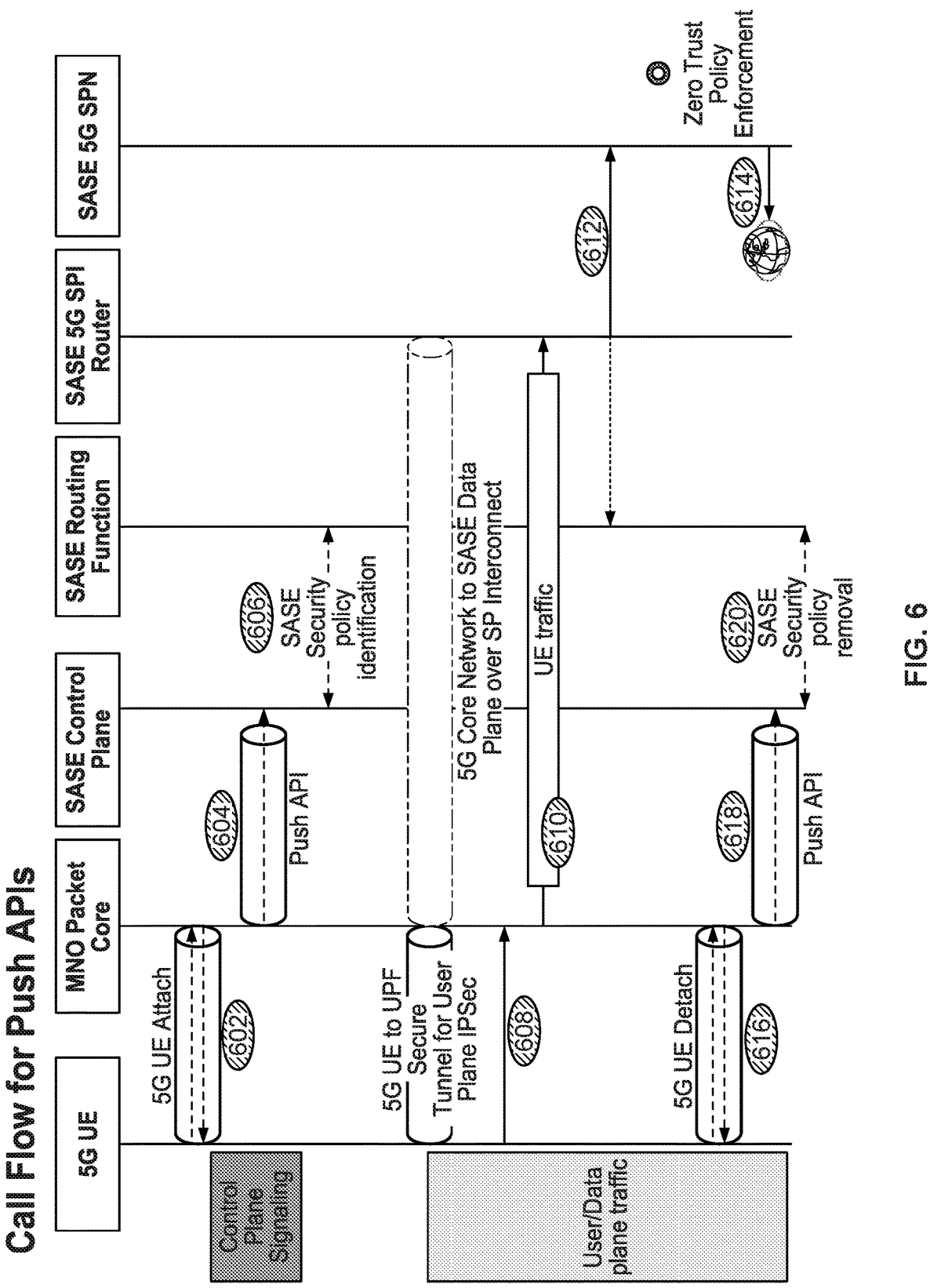
FIG. 6 is a call flow diagram of a SASE solution for providing enhanced security for mobile networks using push APIs in accordance with some embodiments.

FIG. 6 is a call flow diagram of a SASE solution for providing enhanced security for mobile networks using push APIs in accordance with some embodiments.

Figure 7:
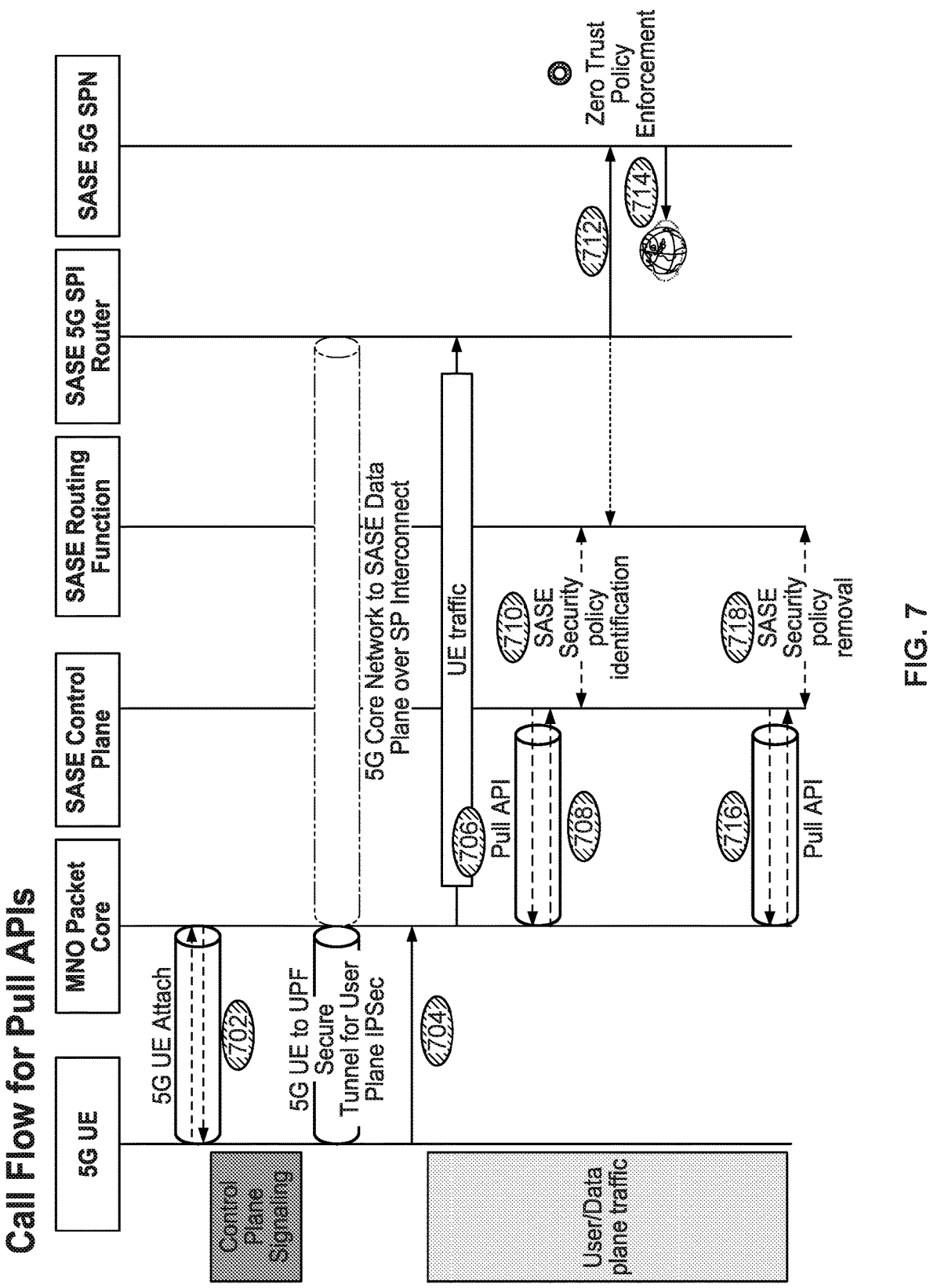
FIG. 7 is a call flow diagram of a SASE solution for providing enhanced security for mobile networks using pull APIs in accordance with some embodiments.

FIG. 7 is a call flow diagram of a SASE solution for providing enhanced security for mobile networks using pull APIs in accordance with some embodiments.

The disclosed techniques for providing a SASE solution for mobile networks are shown in FIGS. 6 and 7 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

Specifically, in these example call flow diagrams of a SASE solution for applying security, such as per network slice security (e.g., and/or based on other contextual information, such as subscriber/user including IMSI, IMEI, MSISDN/external identifier, RAT type, DNN/APN, location, user IP, and/or other contextual information), in mobile networks with SASE using APIs (e.g., REST, gRPC, and/or other forms of APIs), SASE cloud 102, such as shown in FIG. 1, receives Syslog messages from a mobile network over a secure channel, such as an interconnect with IPsec 110, such as shown in FIG. 1. The SASE cloud processes the APIs to extract network slice (S-NSSAI) and user equipment (UE) IP information (e.g., and/or other contextual information can similarly be extracted, such as subscriber/user including IMSI, IMEI, MSISDN/external identifier, RAT type, DNN/APN, location, user IP, and/or other contextual information). The SASE cloud will add entry of UE IP and contextual information including S-NSSAI related to this subscriber/user in a data store (e.g., as shown at 134 in FIG. 1).

The APIs can be implemented using a push mechanism or a pull mechanism, such as described below.

In an example push implementation, an entity, such as a database, network function, and/or management system, can trigger an API based on events, such as a UE attach event or a UE detach event.

In an example pull implementation, the SASE cloud can request the network slice information (e.g., and/or other contextual information can similarly be requested, such as subscriber/user including IMSI, IMEI, MSISDN/external identifier, RAT type, DNN/APN, location, user IP, and/or other contextual information) for an IP address that does not (yet) have a mapping in the UE IP mapping data store (e.g., as shown at 134 in FIG. 1).

As such, in this example implementation, the SASE cloud can remove entry of a UE IP and related contextual information from the data store in the event of the following: (1) an API is received when a PDU session is deleted; or (2) a User/Subscriber session times out (e.g., the timeout can be a configurable setting).

More specifically, to apply context-based security on the traffic from UEs, a Security Platform including a Security Processing Node (SPN) in the SASE cloud, such as shown at 114 in FIG. 1, can utilize a UE IP mapping data store (e.g., as shown at 134 in FIG. 1). The UE traffic is routed over a secure channel between the mobile network and the SASE cloud such as similarly described above with respect to FIG. 1.

Referring to FIG. 6, at 602, a 5G UE attach message is sent from a 5G UE to an MNO Packet Core. At 604, the MNO forwards a push API(s) to a SASE Control Plane, such as over a secure channel (e.g., secure channel/interconnect 110 as shown in FIG. 1). At 606, a SASE routing function performs a security policy identification (e.g., based on contextual information extracted from the push API(s), such as based on a network slice and/or other contextual information, such as subscriber/user including IMSI, IMEI, MSISDN/external identifier, RAT type, DNN/APN, location, user IP, and/or other contextual information). At 608, 5G UE to UPF Secure Tunnel for User Plane IPSec traffic is established between the 5G UE and MNO Packet Core for User/Data Plane traffic. At 610, the UE traffic (e.g., User/Data Plane traffic) is transmitted to a SASE 5G SPI Router (e.g., Security I/C Router 112 as shown in FIG. 1). At 612, the UE traffic (e.g., User/Data Plane traffic) is transmitted to a SASE 5G SPN (e.g., 5G SPN Clusters 114 as shown in FIG. 1), which can then, as shown at 614, egress to the Internet (e.g., as shown at 120 in FIG. 1). At 616, a 5G UE Detach message is sent from the 5G UE to the MNO Packet Core. At 618, the MNO forwards the push API(s) to the SASE Control Plane. At 620, the SASE Control Plane and SASE Routing Function communicate the SASE Security policy removal for the terminating session for the 5G UE.

Referring to FIG. 7, at 702, a 5G UE attach message is sent from a 5G UE to an MNO Packet Core. At 704, 5G UE to UPF Secure Tunnel for User Plane IPSec traffic is established between the 5G UE and MNO Packet Core for User/Data Plane traffic. At 706, the UE traffic (e.g., User/Data Plane traffic) is transmitted from the MNO Packet Core to a SASE 5G SPI Router (e.g., Security I/C Router 112 as shown in FIG. 1). At 708, a pull API(s) is communicated from the SASE Control Plane to request contextual information (e.g., network slice and/or other contextual information) (e.g., and/or other contextual information can similarly be extracted, such as subscriber/user including IMSI, IMEI, MSISDN/external identifier, RAT type, DNN/APN, location, user IP, and/or other contextual information as further described herein) to the MNO Packet Core. At 710, a SASE routing function performs a security policy identification (e.g., based on contextual information extracted from the pull API(s), such as based on a network slice and/or other contextual information, such as subscriber/user including IMSI, IMEI, MSISDN/external identifier, RAT type, DNN/APN, location, user IP, and/or other contextual information). At 712, the UE traffic (e.g., User/Data Plane traffic) is transmitted to a SASE 5G SPN (e.g., 5G SPN Clusters 114 as shown in FIG. 1), which can then, as shown at 714, egress to the Internet (e.g., as shown at 120 in FIG. 1). At 716, a pull API(s) is communicated from the SASE Control Plane to request information (e.g., a 5G UE Detach message and/or other relevant information such as further described herein) to the MNO Packet Core. At 718, the SASE Control Plane and SASE Routing Function communicate the SASE Security policy removal for the terminating session for the 5G UE.

FIG. 8A is an API login example for network slice related contextual information in accordance with some embodiments.

FIG. 8B is an API login example for subscriber identity and/or equipment identity and/or subscriber number related contextual information in accordance with some embodiments.

FIG. 8C is an API login example for location related contextual information in accordance with some embodiments.

FIG. 8D is an API login example for RAT related contextual information in accordance with some embodiments.

FIG. 9 is an API logout example in accordance with some embodiments.

Figure 10:
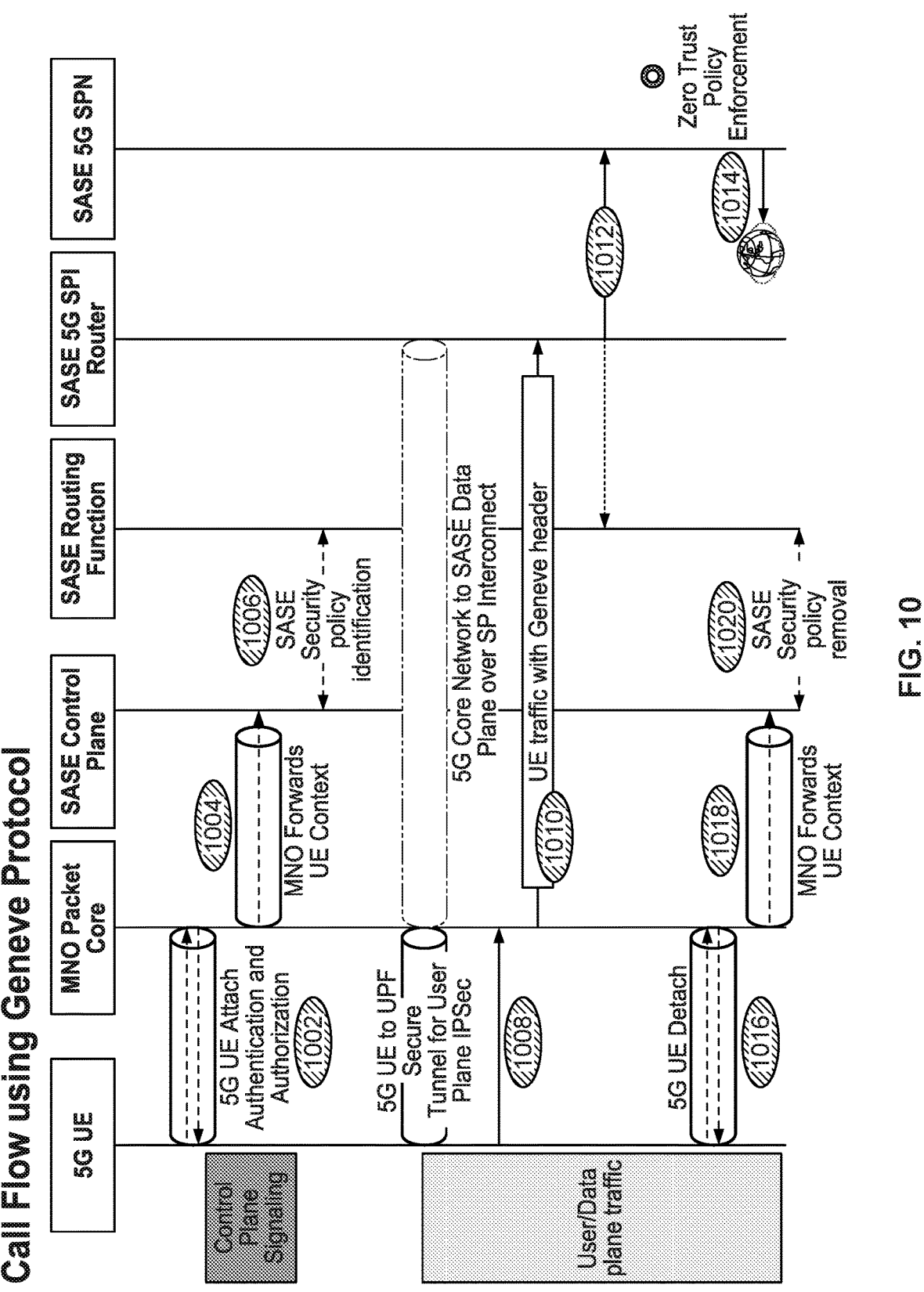
FIG. 10 is a call flow diagram of a SASE solution for providing enhanced security for mobile networks using the Geneve protocol in accordance with some embodiments.

Techniques to Apply Per Context-Based Security in Mobile Networks with SASE Using the Geneve Protocol FIG. 10 is a call flow diagram of a SASE solution for providing enhanced security for mobile networks using the Geneve protocol in accordance with some embodiments.

Figure 11:
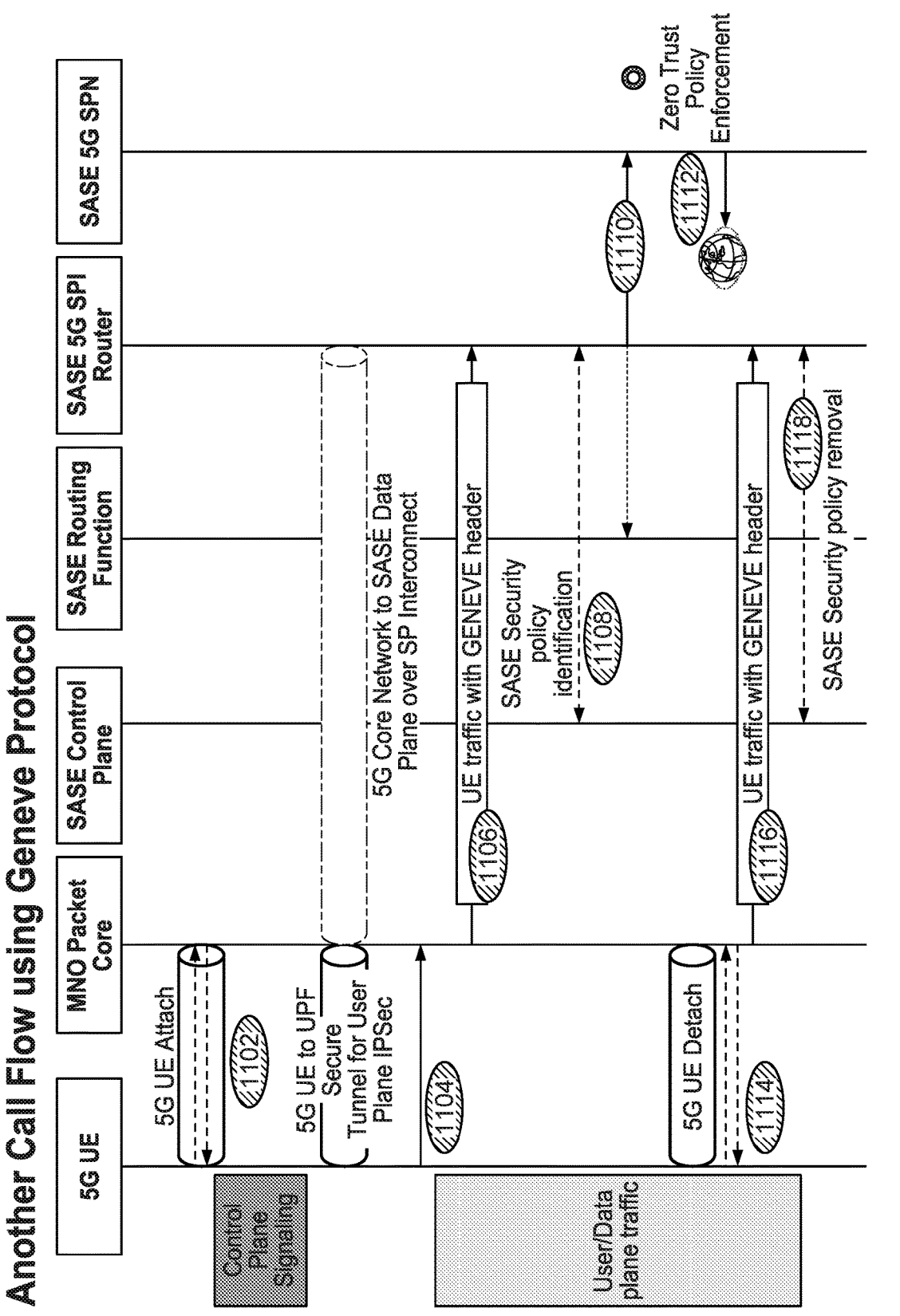
FIG. 11 is another call flow diagram of a SASE solution for providing enhanced security for mobile networks using the Geneve protocol in accordance with some embodiments.

FIG. 11 is another call flow diagram of a SASE solution for providing enhanced security for mobile networks using the Geneve protocol in accordance with some embodiments.

The disclosed techniques for providing a SASE solution for mobile networks are shown in FIGS. 10 and 11 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

Specifically, in these example call flow diagrams of a SASE solution for applying security, such as per (e.g., and/or based on other contextual information, such as subscriber/user including IMSI, IMEI, MSISDN/external identifier, RAT type, DNN/APN, location, user IP, and/or other contextual information) security, in mobile networks with SASE using the Geneve protocol, SASE cloud 102, such as shown in FIG. 1, receives UE traffic encapsulated in a Geneve tunnel from a mobile network over a secure channel, such as an interconnect with IPsec 110, such as shown in FIG. 1. The SASE cloud terminates the Geneve tunnel and decapsulates packets to extract (S-NSSAI) and user equipment (UE) IP information (e.g., and/or other contextual information can similarly be extracted, such as subscriber/user including IMSI, IMEI, MSISDN/external identifier, RAT type, DNN/APN, location, user IP, and/or other contextual information). The SASE cloud will add entry of UE IP and contextual information including S-NSSAI related to this subscriber/user in a data store (e.g., as shown at 134 in FIG. 1).

Also, a mobile network operator (MNO) can encapsulate the UE traffic in the Geneve tunnel. In this example implementation, the Geneve tunnel includes the following information: IMSI, IMEI, MSISDN/external identifier, S-NSSAI (SST, SD), IPv4, and IPv6.

As such, in this example implementation, the SASE cloud can remove entry of a UE IP and related contextual information from the data store in the event of the following: (1) UE detach information is received in the Geneve header; or (2) a User/Subscriber session times out (e.g., the timeout can be a configurable setting).

More specifically, to apply context-based security on the traffic from UEs, a Security Platform including a Security Processing Node (SPN) in the SASE cloud, such as shown at 114 in FIG. 1, can utilize a UE IP mapping data store (e.g., as shown at 134 in FIG. 1). The UE traffic is routed over a secure channel between the mobile network and the SASE cloud such as similarly described above with respect to FIG. 1.

Referring to FIG. 10, in this example, call flow using the Geneve protocol, the Mobile Network first sends UE context including IMSI, IMEI, MSISDN/external identifier, S-NS-SAI, and UE IP information to the SASE cloud via one of the above-described techniques, such as using the PFCP protocol, Radius protocol, and/or APIs. The SASE control plane receives the UE context and IP mapping. The UE traffic is sent by the mobile network operator (MNO) with GENEVE header including UE context information including IMSI, IMEI, MSISDN/external identifier, S-NSSAI, and UE IP to the SASE cloud. This approach has the following example benefits: (1) the SASE cloud can verify the information sent via the above-described techniques, such as using the PFCP protocol, Radius protocol, and/or APIs; and (2) the SASE cloud can apply a security policy to the UE traffic even if there is loss of UE context information in one of these two communication mechanisms used during transport or due to some other issue.

At 1002, a 5G UE attach message (e.g., including Authentication and Authorization) is sent from a 5G UE to an MNO Packet Core. At 1004, the MNO forwards the UE context to a SASE Control Plane, such as over a secure channel (e.g., secure channel/interconnect 110 as shown in FIG. 1). At 1006, a SASE routing function performs a security policy identification (e.g., based on contextual information extracted as described above, such as based on a network slice and/or other contextual information, such as subscriber/user including IMSI, IMEI, MSISDN/external identifier, RAT type, DNN/APN, location, user IP, and/or other contextual information as further described herein). At 1008, a 5G UE to UPF Secure Tunnel for User Plane IPSec traffic is established between the 5G UE and MNO Packet Core for User/Data Plane traffic. At 1010, the UE traffic (e.g., User/Data Plane traffic) is transmitted to a SASE 5G SPI Router (e.g., Security I/C Router 112 as shown in FIG. 1). At 1012, the UE traffic (e.g., User/Data Plane traffic) is transmitted to a SASE 5G SPN (e.g., 5G SPN Clusters 114 as shown in FIG. 1), which can then, as shown at 1014, egress to the Internet (e.g., as shown at 120 in FIG. 1). At 1016, a 5G UE Detach message is sent from the 5G UE to the MNO Packet Core. At 1018, the MNO forwards the UE context to the SASE Control Plane. At 1020, the SASE Control Plane and SASE Routing Function communicate the SASE Security policy removal for the terminating session for the 5G UE.

Referring to FIG. 11, at 1102, a 5G UE attach message is sent from a 5G UE to an MNO Packet Core. At 1104, 5G UE to UPF Secure Tunnel for User Plane IPSec traffic is established between the 5G UE and MNO Packet Core for User/Data Plane traffic. At 1106, the UE traffic (e.g., User/Data Plane traffic) with a Geneve header is transmitted to a SASE 5G SPI Router (e.g., Security I/C Router 112 as shown in FIG. 1). At 1108, a SASE routing function performs a security policy identification (e.g., based on contextual information extracted as described above, such as based on a network slice and/or other contextual information, such as subscriber/user including IMSI, IMEI, MSISDN/external identifier, RAT type, DNN/APN, location, user IP, and/or other contextual information as further described herein). At 1110, the UE traffic (e.g., User/Data Plane traffic) is transmitted to a SASE 5G SPN (e.g., 5G SPN Clusters 114 as shown in FIG. 1), which can then, as shown at 1112, egress to the Internet (e.g., as shown at 120 in FIG. 1). At 1114, a 5G UE Detach message is sent from the 5G UE to the MNO Packet Core. At 1116, the MNO Packet Core forwards the UE traffic with Geneve header to the SASE 5G SPI Router. At 1118, the SASE Control Plane and SASE 5G SPI Router communicate the SASE Security policy removal for the terminating session for the 5G UE.

Accordingly, the above-described techniques and various embodiments for a SASE solution for providing enhanced security for mobile networks can be applied to provide one or more of the following: (1) secure data traffic flow (e.g., private app access, SaaS app access, other apps/services, etc.) from and to 4G/5G/6G/later devices; (2) secure Internet access from 4G/5G/6G/later UEs; (3) secure access to enterprise data center from 4G/5G/6G/later UEs; (4) enforcement of UE (user) specific security policies (e.g., based on UE IP, IMSI, IMEI, MSISDN/external identifier, location, APN/DNN, network slice, RAT, and/or other contextual information); and (5) separation of security policies for each tenant (e.g., automatically detecting each MSP Enterprise tenant (tenant ID) associated with each data packet passing through the SASE/security core network).

Additional example processes for the disclosed techniques for providing a SASE solution for providing enhanced security for mobile networks will now be further described below.

Example Processes for a Service Access Service Edge (SASE) Solution for Providing Enhanced Security for Mobile Networks FIG. 12 is a flow diagram of a process for providing a SASE solution for providing enhanced security for mobile networks in accordance with some embodiments. In some embodiments, a process as shown in FIG. 12 is performed by the SASE solution and techniques as similarly described above including the embodiments described above with respect to FIGS. 1-11. In one embodiment, the process is performed, at least in part, by 5G SPN clusters 114 as described above with respect to FIG. 1.

The process begins at 1202. At 1202, traffic associated with a User Equipment (UE) from a mobile core network is received at a Secure Access Service Edge (SASE) cloud network. As similarly described above with respect to FIG. 1, a secure channel, such as an interconnect (e.g., a GCP interconnect or other cloud to cloud interconnect) can be used for securely transmitting traffic from the mobile core network to the SASE cloud network.

At 1204, extracting contextual information associated with the traffic to determine a security policy to apply to the traffic is performed. In this example implementation, the contextual information can include IMSI, IMEI, MSISDN/external identifier, RAT type, Network Slice, DNN/APN, location, user/UE IP, and/or other contextual information.

At 1206, enforcing the security policy on data plane traffic associated with the UE based on contextual information associated with the UE to provide secured data plane traffic is performed. For example, various enforcement actions (e.g., allow/pass, block/drop, alert, tag, monitor, log, throttle, restrict access, and/or other enforcement actions) can be performed using the security platform as similarly described above. As similarly described above with respect to FIGS. 1-11, the security policy can be determined and/or enforced based on various combinations of IMSI, IMEI, MSISDN/external identifier, RAT type, Network Slice, DNN/APN, location, user/UE IP, and/or other contextual information and/or based on information detected/determined using DPI-based firewall techniques, such as by performing URL filtering, identifying an Application-ID, identifying a Content-ID, and/or using other DPI-based firewall techniques as similarly described above.

FIG. 13 is another flow diagram of a process for providing a SASE solution for providing enhanced security for mobile networks in accordance with some embodiments. In some embodiments, a process as shown in FIG. 13 is performed by the SASE solution and techniques as similarly described above including the embodiments described above with respect to FIGS. 1-11. In one embodiment, the process is performed, at least in part, by 5G SPN clusters 114 as described above with respect to FIG. 1.

The process begins at 1302. At 1302, traffic associated with a User Equipment (UE) from a mobile core network is received at a Secure Access Service Edge (SASE) cloud network. As similarly described above with respect to FIG. 1, a secure channel, such as an interconnect (e.g., a GCP interconnect or other cloud to cloud interconnect) can be used for securely transmitting traffic from the mobile core network to the SASE cloud network.

At 1304, a message is received over a network protocol from the mobile core network at the SASE cloud network. For example, the contextual information associated with the message can be communicated using a Packet Forwarding Control Protocol (PFCP), a Radius protocol, a Diameter protocol, Syslog messages, an Application Programming Interface (API), and/or a Geneve protocol.

At 1306, contextual information associated with the traffic is extracted from the message to determine a security policy to apply to the traffic. In this example implementation, the contextual information can include IMSI, IMEI, MSISDN/external identifier, RAT type, Network Slice, DNN/APN, location, user/UE IP, and/or other contextual information.

At 1308, enforcing the security policy on data plane traffic associated with the UE based on contextual information associated with the UE to provide secured data plane traffic is performed. For example, various enforcement actions (e.g., allow/pass, block/drop, alert, tag, monitor, log, throttle, restrict access, and/or other enforcement actions) can be performed using the security platform as similarly described above. As similarly described above with respect to FIGS. 1-11, the security policy can be determined and/or enforced based on various combinations of IMSI, IMEI, MSISDN/external identifier, RAT type, Network Slice, DNN/APN, location, user/UE IP, and/or other contextual information and/or based on information detected/determined using DPI-based firewall techniques, such as by performing URL filtering, identifying an Application-ID, identifying a Content-ID, and/or using other DPI-based firewall techniques as similarly described above.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:
1. A system, comprising:
a processor configured to:
receive traffic associated with a User Equipment (UE) from a mobile core network at a Secure Access Service Edge (SASE) cloud network;
extract contextual information associated with the traffic to determine a security policy to apply to the traffic; and
enforce the security policy on data plane traffic associated with the UE based on the contextual information associated with the UE to provide secured data plane traffic; and
a memory coupled to the processor and configured to provide the processor with instructions.
2. The system recited in claim 1, wherein the contextual information is extracted using a Packet Forwarding Control Protocol (PFCP), a Radius protocol, a Diameter protocol, a Syslog message, an Application Programming Interface (API), and/or a Geneve protocol.
3. The system recited in claim 1, wherein the SASE cloud network includes a firewall as a service that is configured with a plurality of security policies based on a subscriber identity and an application identifier, and wherein the subscriber identity includes an International Mobile Subscriber Identity (IMSI).
4. The system recited in claim 1, wherein the SASE cloud network includes a firewall as a service that is configured with a plurality of security policies based on a subscriber identity, a unique device identifier, a subscriber number, and an application identifier, wherein the subscriber identity includes an International Mobile Subscriber Identity (IMSI), wherein the unique device identifier includes an International Mobile Equipment Identifier (IMEI), and wherein the subscriber number includes a General Public Subscription Identifier (GPSI), a Mobile Station International Subscriber Director Number (NSISDN), and/or another external identifier.
5. The system recited in claim 1, wherein the mobile core network includes a 4G mobile core network, a 5G mobile core network, and/or 6G mobile core network.
6. The system recited in claim 1, wherein the data plane traffic is secured from and to 4G, 5G, and/or 6G UE devices.
7. The system recited in claim 1, wherein Internet access is secured from and to 4G, 5G, and/or 6G UE devices.
8. The system recited in claim 1, wherein enterprise data center access is secured from and to 4G, 5G, and/or 6G UE devices.
9. The system recited in claim 1, wherein selection and the enforcement of the security policy is based on the contextual information associated with the UE and the data plane traffic correlated with the UE based on a UE Internet Protocol (IP) address.
10. The system recited in claim 1, wherein a firewall as a service (FWaaS) associated with the SASE cloud network is configured to perform Uniform Resource Link (URL) filtering for the data plane traffic.
11. The system recited in claim 1, wherein a firewall as a service (FWaaS) associated with the SASE cloud network is configured to perform application Denial of Service (DoS) detection for the data plane traffic.

12. The system recited in claim 1, wherein a firewall as a service (FWaaS) associated with the SASE cloud network is configured to perform threat prevention for the data plane traffic.

13. The system recited in claim 1, wherein a firewall as a service (FWaaS) associated with the SASE cloud network is configured to perform advanced threat prevention for the data plane traffic.

14. The system recited in claim 1, wherein a firewall as a service (FWaaS) associated with the SASE cloud network is configured to perform advanced Uniform Resource Link (URL) filtering for the data plane traffic.

15. The system recited in claim 1, wherein each of a plurality of security policies is distinctly selected and enforced for each mobile service provider (MSP) enterprise tenant at the SASE cloud network, wherein per tenant security policy configuration and enforcement are provided by the SASE cloud network.

16. The system recited in claim 1, wherein the data plane traffic is encapsulated with meta information, including a subscriber identity and/or a unique device identifier.

17. The system recited in claim 1, wherein the processor is further configured to:

determine the security policy to apply at the SASE cloud network to the data plane traffic based on a subscriber identity and/or a unique device identifier.

18. The system recited in claim 1, wherein the processor is further configured to:

receive a message over a network protocol from the mobile core network at the SASE cloud network, wherein contextual information associated with the message is communicated using a Packet Forwarding Control Protocol (PFCP), a Radius protocol, a Diameter protocol, Syslog messages, an Application Programming Interface (API), and/or a Geneve protocol.

19. The system recited in claim 1, wherein the processor is further configured to:

receive an accounting message from the mobile core network at the SASE cloud network, wherein contextual information associated with the accounting message is communicated using a DIAMETER protocol, a Radius protocol, and/or via an Application Programming Interface (API).

20. A method, comprising:

receiving traffic associated with a User Equipment (UE) from a mobile core network at a Secure Access Service Edge (SASE) cloud network;

extracting contextual information associated with the traffic to determine a security policy to apply to the traffic; and enforcing the security policy on data plane traffic associated with the UE based on the contextual information associated with the UE to provide secured data plane traffic.

21. The method of claim 20, wherein the contextual information is extracted using a Packet Forwarding Control Protocol (PFCP), a Radius protocol, a Diameter protocol, a Syslog message, an Application Programming Interface (API), and/or a Geneve protocol.

22. A computer program product, the computer program product being embodied in a tangible computer readable storage medium and comprising computer instructions for:

receiving traffic associated with a User Equipment (UE) from a mobile core network at a Secure Access Service Edge (SASE) cloud network;

extracting contextual information associated with the traffic to determine a security policy to apply to the traffic; and enforcing the security policy on data plane traffic associated with the UE based on the contextual information associated with the UE to provide secured data plane traffic.

23. The computer program product recited in claim 22, wherein the contextual information is extracted using a Packet Forwarding Control Protocol (PFCP), a Radius protocol, a Diameter protocol, a Syslog message, an Application Programming Interface (API), and/or a Geneve protocol.

\* \* \* \* \*